US011463301B2

(12) United States Patent
Zhou et al.

(10) Patent No.: US 11,463,301 B2
(45) Date of Patent: Oct. 4, 2022

(54) ON-DEMAND BEAM FAILURE RECOVERY RESOURCES

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/837,925

(22) Filed: Apr. 1, 2020

(65) Prior Publication Data

US 2020/0358647 A1 Nov. 12, 2020

Related U.S. Application Data

(60) Provisional application No. 62/846,580, filed on May 10, 2019.

(51) Int. Cl.
*H04L 41/0654* (2022.01)
*H04L 1/18* (2006.01)
(Continued)

(52) U.S. Cl.
CPC ........ *H04L 41/0654* (2013.01); *H04L 1/1812* (2013.01); *H04L 5/0055* (2013.01);
(Continued)

(58) Field of Classification Search
None
See application file for complete search history.

(56) References Cited

U.S. PATENT DOCUMENTS 10,868,772 B2 * 12/2020 Zhang ................. H04L 41/0677
2018/0191422 A1 7/2018 Xia et al.
(Continued)

FOREIGN PATENT DOCUMENTS

WO WO-2017024516 A1 2/2017
WO WO-2018171044 A1 9/2018

OTHER PUBLICATIONS

CATT: "The Validity of CFRA Resources for BFR", 3GPP Draft, 3GPP TSG-RAN WG2 #102, R2-1806998, The Validity of CFRA Resources for BFR—FINAL, 3rd Generation Partnership Project (3GPP), Mobile Competence Centre, 650, Route Des Lucioles, F-06921 Sophia-Antipolis Cedex, vol. RAN WG2, No. Busan, Korea, May 21, 2018-May 25, 2018, May 11, 2018 (May 11, 2018), XP051464494, pp. 1-5, Retrieved from the Internet: URL: http://www.3gpp.org/ftp/tsg%5Fran/WG2%5FRL2/TSGR2%5F102/Docs, [retrieved on May 11, 2018], the whole document.
(Continued)

*Primary Examiner* — Anh Ngoc M Nguyen
(74) *Attorney, Agent, or Firm* — Holland & Hart LLP/Qualcomm Incorporated

(57) ABSTRACT

Methods, systems, and devices for wireless communications are described. A device in a wireless network may identify a resource for wireless communication, the resource being in a first state where the resource is active for wireless communication and is inactive for a communication failure recovery procedure. The device may determine that a communication failure has occurred during a first communication period. The device may transition, during a second communication period and based at least in part on the communication failure, the resource to a second state where
(Continued)

the resource is inactive for wireless communication and is active for the communication failure recovery procedure. The device may perform the communication failure recovery procedure using the resource transitioned to the second state.

30 Claims, 17 Drawing Sheets

(51) Int. Cl.
*H04L 5/00* (2006.01)
*H04W 28/04* (2009.01)
*H04W 72/04* (2009.01)
*H04W 24/06* (2009.01)

(52) U.S. Cl.
CPC ........... *H04W 24/06* (2013.01); *H04W 28/04* (2013.01); *H04W 72/042* (2013.01); *H04W 72/0413* (2013.01)

(56) References Cited

U.S. PATENT DOCUMENTS

| | | | |
|---|---|---|---|
| 2019/0082334 A1 | 3/2019 | Nagaraja et al. | |
| 2019/0110281 A1 | 4/2019 | Zhou et al. | |
| 2019/0159100 A1* | 5/2019 | Liou | H04W 72/042 |
| 2019/0349061 A1* | 11/2019 | Cirik | H04B 7/0617 |
| 2019/0356371 A1 | 11/2019 | Os et al. | |
| 2020/0092785 A1 | 3/2020 | Yang | |
| 2020/0137801 A1 | 4/2020 | Chen et al. | |
| 2020/0137821 A1 | 4/2020 | Cirik et al. | |
| 2020/0187079 A1* | 6/2020 | Nagakubo | H04W 36/08 |
| 2020/0358582 A1 | 11/2020 | Takeda et al. | |
| 2020/0373991 A1 | 11/2020 | Zhou et al. | |
| 2021/0036759 A1* | 2/2021 | Kim | H04B 7/0695 |
| 2021/0058134 A1 | 2/2021 | Luo et al. | |
| 2021/0195675 A1* | 6/2021 | Park | H04W 88/14 |
| 2021/0218457 A1* | 7/2021 | Xu | H04W 76/19 |

OTHER PUBLICATIONS

International Search Report and Written Opinion—PCT/US2020/026313—ISAEPO—dated Jun. 29, 2020 (192759WO).
"3rd Generation Partnership Project; Technical Specification Group Radio Access Network; NR; Physical layer procedures for control (Release 15)," 3GPP Standard; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.0.0 (Dec. 2017), Jan. 3, 2018 (Jan. 3, 2018), pp. 1-56, XP051392263, [retrieved on Jan. 3, 2018].
Apple: "Discussion on SL RLM / RLF Declaration", 3GPP Draft, 3GPP TSG-RAN WG2 Meeting #106, R2-1906773 SL RLM, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051730228, 4 p. Retrieved from the Internet: URL: http://www.3gpp.org/ftp/Meetings%5F3GPP%5FSYNC/RAN2/Docs/R2%2D1906773%2Ezip. [retrieved on May 13, 2019] pp. 2,3.
Huawei, et al., "Beamforming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593708, 5 pages Retrieved from the Internet: URL: http://www.3gpp.org/ftp/Meetings%5F3GPP%5FSYNC/RAN1/Docs/R1%2D1900862%2Ezip, [retrieved on Jan. 20, 2019], Section 2.3, The Whole Document, p. 1-p. 2 paragraph 2.3.
NTT Docomo, Inc: "Further Views on Mechanism to Recover from Beam Failure", 3GPP Draft, R1-1713919_Beam_Recovery, 3GPP TSG RAN WG1 #90, 3rd Generation Partnership Project (3GPP), Mobile Competence Centre, 650, Route Des Lucioles, F-06921, Sophia-Antipolis Cedex, France, vol. Ran WG1, No. Prague, Czechia, Aug. 21, 2017- Aug. 25, 2017, Aug. 20, 2017 (Aug. 20, 2017), XP051316711, 6 Pages, Retrieved from the Internet: URL:http://www.3gpp.org/ftp/Meetings_3GPP_SYNC/RAN1/Docs/ [retrieved on Aug. 20, 2017], Section 4, Figure 3.

* cited by examiner

ON-DEMAND BEAM FAILURE RECOVERY RESOURCES

CROSS REFERENCE

The present application for patent claims the benefit of U.S. Provisional Patent Application No. 62/846,580 by ZHOU et al., entitled "ON-DEMAND BEAM FAILURE RECOVERY RESOURCES," filed May 10, 2019, assigned to the assignee hereof, and expressly incorporated by reference herein.

INTRODUCTION

The following relates to wireless communications, and more specifically to beam failure recovery (BFR) resources.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a device in a wireless network is described. The method may include determining a resource for wireless communication, the resource being in a first state where the resource is active for wireless communication and is inactive for a communication failure recovery procedure. The method may further include determining that a communication failure has occurred during a first communication period and transitioning, during a second communication period and based on the communication failure, the resource to a second state where the resource is inactive for wireless communication and is active for the communication recovery procedure. The method may further include performing the communication failure recovery procedure using the resource transitioned to the second state.

An apparatus for wireless communication at a device in a wireless network is described. The apparatus may include a processor and memory coupled to the processor. The processor and memory may be configured to determine a resource for wireless communication, the resource being in a first state where the resource is active for wireless communication and is inactive for a communication failure recovery procedure. The processor and memory may be further configured to determine that a communication failure has occurred during a first communication period and transition, during a second communication period and based on the communication failure, the resource to a second state where the resource is inactive for wireless communication and is active for the communication recovery procedure. The processor and memory be further configured to perform the communication failure recovery procedure using the resource transitioned to the second state.

Another apparatus for wireless communication at a device in a wireless network is described. The apparatus may include means for determining a resource for wireless communication, the resource being in a first state where the resource is active for wireless communication and is inactive for a communication failure recovery procedure. The apparatus may further include means for determining that a communication failure has occurred during a first communication period and transitioning, during a second communication period and based on the communication failure, the resource to a second state where the resource is inactive for wireless communication and is active for the communication recovery procedure. The apparatus may further include means for performing the communication failure recovery procedure using the resource transitioned to the second state.

A non-transitory computer-readable medium storing code for wireless communication at a device in a wireless network is described. The code may include instructions executable by a processor to determine a resource for wireless communication, the resource being in a first state where the resource is active for wireless communication and is inactive for a communication failure recovery procedure. The code may further include instructions executable by a processor to determine that a communication failure has occurred during a first communication period and transition, during a second communication period and based on the communication failure, the resource to a second state where the resource is inactive for wireless communication and is active for the communication recovery procedure. The code may further include instructions executable by a processor to perform the communication failure recovery procedure using the resource transitioned to the second state.

In some examples of the method, apparatuses, and non-transitory computer-readable medium described herein, the communication failure recovery procedure includes at least one of a BFR, or a radio link failure recovery, or a combination thereof.

In some examples of the method, apparatuses, and non-transitory computer-readable medium described herein, determining that the communication failure may have occurred may include operations, features, means, or instructions for determining that at least one of a downlink transmission or an uplink transmission was unsuccessful with a UE during the first communication period.

In some examples of the method, apparatuses, and non-transitory computer-readable medium described herein, a determination of an unsuccessful downlink transmission may include operations, features, means, or instructions for failing to receive a positive acknowledgement (ACK) message for either an initial downlink transmission or a downlink retransmission.

In some examples of the method, apparatuses, and non-transitory computer-readable medium described herein, a determination of an unsuccessful downlink transmission may include operations, features, means, or instructions for determining that a number of codeblock groups having a positive ACK message in a received downlink ACK may be below a threshold for either an initial downlink transmission or a downlink retransmission.

In some examples of the method, apparatuses, and non-transitory computer-readable medium described herein, a determination of an unsuccessful uplink transmission may include operations, features, means, or instructions for failing to receive an uplink packet in either an initial uplink transmission or an uplink retransmission.

Some examples of the method, apparatuses, and non-transitory computer-readable medium described herein may further include operations, features, means, or instructions for transmitting one or more BFR candidate beam reference signals using the resource transitioned to the second state.

Some examples of the method, apparatuses, and non-transitory computer-readable medium described herein may further include operations, features, means, or instructions for receiving a BFR request signal from the UE identifying a preferred candidate beam associated with at least one of the one or more BFR candidate beam reference signals.

Some examples of the method, apparatuses, and non-transitory computer-readable medium described herein may further include operations, features, means, or instructions for transmitting a BFR response.

Some examples of the method, apparatuses, and non-transitory computer-readable medium described herein may further include operations, features, means, or instructions for determining that a BFR request signal failed to be received from the UE during the second communication period. Such examples may further include operations, features, means, or instructions for performing wireless communication with the UE during a third communication period using a same beam as was used during the first communication period.

Some examples of the method, apparatuses, and non-transitory computer-readable medium described herein may further include operations, features, means, or instructions for determining that a BFR request signal was received from the UE during the second communication period. Such examples may further include operations, features, means, or instructions for performing wireless communication with the UE during a third communication period using a candidate beam identified in the BFR request signal.

In some examples of the method, apparatuses, and non-transitory computer-readable medium described herein, determining that the communication failure may have occurred may include operations, features, means, or instructions for determining that at least one of a downlink transmission or an uplink transmission was unsuccessful with a base station during the first communication period.

In some examples of the method, apparatuses, and non-transitory computer-readable medium described herein, a determination of an unsuccessful downlink transmission may include operations, features, means, or instructions for failing to receive a positive downlink ACK for either an initial downlink transmission or a downlink retransmission.

In some examples of the method, apparatuses, and non-transitory computer-readable medium described herein, a determination of an unsuccessful downlink transmission may include operations, features, means, or instructions for determining that a number of codeblock groups having a positive ACK message in a transmitted downlink ACK may be below a threshold for either an initial downlink transmission or a downlink retransmission.

In some examples of the method, apparatuses, and non-transitory computer-readable medium described herein, a determination of an unsuccessful uplink transmission may include operations, features, means, or instructions for failing to transmit an uplink packet in either an initial uplink transmission or an uplink retransmission.

Some examples of the method, apparatuses, and non-transitory computer-readable medium described herein may further include operations, features, means, or instructions for receiving one or more BFR candidate beam reference signals using the resource transitioned to the second state.

Some examples of the method, apparatuses, and non-transitory computer-readable medium described herein may further include operations, features, means, or instructions for transmitting a BFR request signal to the base station identifying a preferred candidate beam associated with at least one of the one or more BFR candidate beam reference signals. Such examples may further include operations, features, means, or instructions for performing wireless communication with the base station during a third communication period using the preferred candidate beam identified in the BFR request signal.

Some examples of the method, apparatuses, and non-transitory computer-readable medium described herein may further include operations, features, means, or instructions for receiving a BFR response.

In some examples of the method, apparatuses, and non-transitory computer-readable medium described herein, the second communication period occurs after the first communication period.

In some examples of the method, apparatuses, and non-transitory computer-readable medium described herein, the device in the wireless network includes at least one of a UE or a base station.

DETAILED DESCRIPTION

Figure 1:
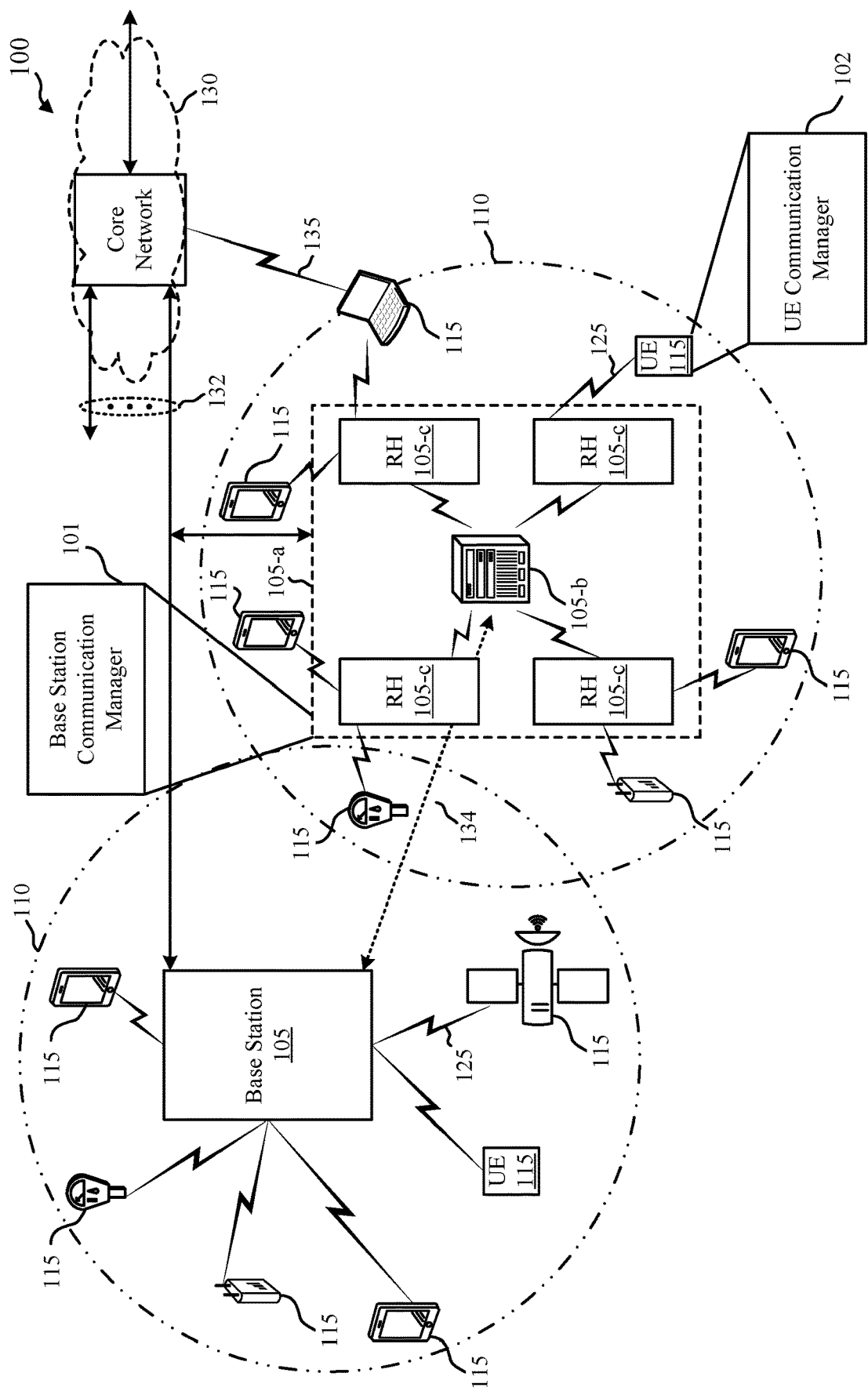
FIG. 1 illustrates an example of a system for wireless communication that supports on-demand BFR resources in accordance with one or more aspects of the present disclosure.

Wireless communication systems may operate in millimeter wave (mmW) frequency ranges (e.g., 28 GHz, 40 GHz, 60 GHz, etc.). Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner. In some cases, a device may select an active beam for communicating with a network by selecting the strongest beam from among a number of candidate beams.

In some aspects, wireless communication systems, such as those operating in the mmW frequency ranges, may experience a loss of communications due to a beam failure event and/or a radio link failure event. For example, due to UE mobility, blocking, and the like, the current transmit/receive beam pair for the UE and/or the base station may suddenly become unavailable or otherwise unusable. When this occurs, a communication failure recovery procedure may be implemented in order to identify and activate a new beam to use for communications. However, some techniques may include resources for the communication failure recovery procedure preconfigured for the UE and/or base station and being available. For example, a set of resources may be configured according to a periodic schedule (e.g., for every slot, every other slot, etc.). However, in some cases, a resource preconfigured for the communication failure recovery procedure may go unused in the absence of a communication failure. In such cases, it may be beneficial to use the resource for other wireless communications.

Accordingly, aspects of the described techniques provide mechanisms whereby on-demand resources are activated during a communication failure, but are otherwise available for use during normal wireless communications. For example, a wireless device (e.g., a device in a wireless network), which may be an example of a UE and/or a base station, may identify the resources that are configured in a first state. In some aspects, the resources configured in the first state may be active or otherwise available to use for wireless communications between the base station and UE, between base stations, and/or between UEs. However, the resources configured in the first state may be inactive to use for a communication failure recovery procedure. The wireless device (e.g., the base station and/or UE) may determine that a communication failure has occurred during a first communication period (e.g., a beam failure, a radio link failure, and the like). Accordingly, the wireless device may transition the resources to a second state where the resources are inactive for wireless communications, but are active for the communication failure recovery procedure. Accordingly, the wireless device may use the resources that have been transitioned to the second state to perform a communication failure recovery procedure.

Aspects of the disclosure are initially described in the context of a wireless communication system. Aspects of the disclosure are further illustrated by and described with reference to apparatus diagrams, system diagrams, and flowcharts that relate to on-demand BFR resources.

FIG. 1 illustrates an example of a wireless communication system 100 that supports on-demand BFR resources in accordance with one or more aspects of the present disclosure. The wireless communication system 100 includes base stations 105, UEs 115, and a core network 130. In some cases, a base station 105 may be depicted as a base station 105-a, as shown in FIG. 1. In some examples, the wireless communication system 100 may be an LTE network, an LTE-A network, an LTE-A Pro network, or an NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet-of-Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through a communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105-*a*, may include subcomponents such as an access network entity 105-*b*, which may be an example of an access node controller (ANC). Each access network entity 105-*b* may communicate with UEs 115 through a number of other access network transmission entities, which may be referred to as a radio head 105-*c*, a smart radio head 105-*c*, or a transmission/reception point (TRP). In some configurations, various functions of each access network entity 105-*b* or base station 105-*a* may be distributed across various network devices (e.g., radio heads 105-*c* and access network controllers) or consolidated into a single network device (e.g., a base station 105-*a*).

Wireless communication system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are incapable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105, when configured as a wireless device, may include a base station communication manager 101, which may identify a resource for wireless communication, the resource being in a first state where the resource is active for wireless communication and is inactive for a communication failure recovery procedure. The base station communication manager 101 may determine that a communication failure has occurred during a first communication period. The base station communication manager 101 may transition, during a second communication period and based at least in part on the communication failure, the resource to a second state where the resource is inactive for wireless communication and is active for the communication recovery procedure. The base station communication manager 101 may perform the communication failure recovery procedure using the resource transitioned to the second state.

UEs 115, when configured as a wireless device, may include a UE communication manager 102, which may identify a resource for wireless communication, the resource being in a first state where the resource is active for wireless communication and is inactive for a communication failure recovery procedure. The UE communication manager 102 may determine that a communication failure has occurred during a first communication period. The UE communication manager 102 may transition, during a second communication period and based at least in part on the communication failure, the resource to a second state where the resource is inactive for wireless communication and is active for the communication recovery procedure. The UE communication manager 102 may perform the communication failure recovery procedure using the resource transitioned to the second state.

Figure 2A:
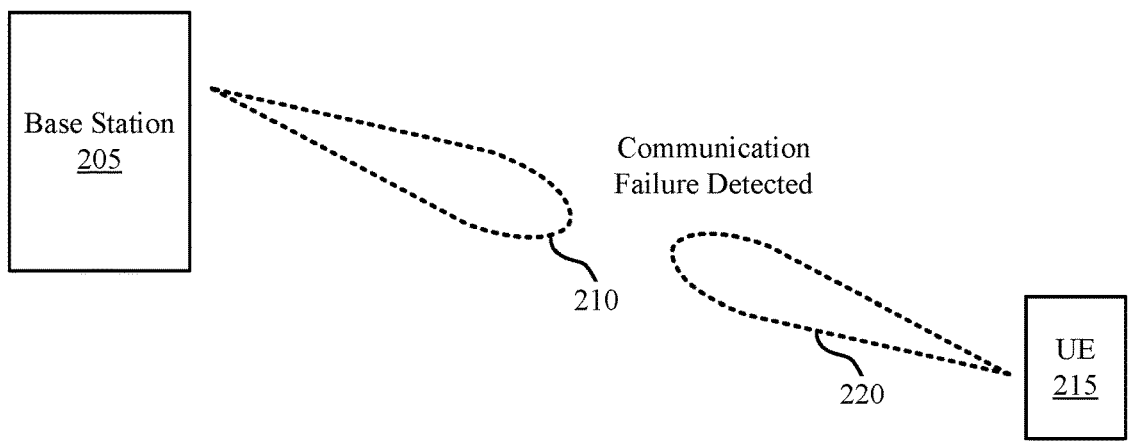
FIGS. 2A-2C illustrate examples of a wireless communication system that supports on-demand BFR resources in accordance with one or more aspects of the present disclosure.
Figure 2B:
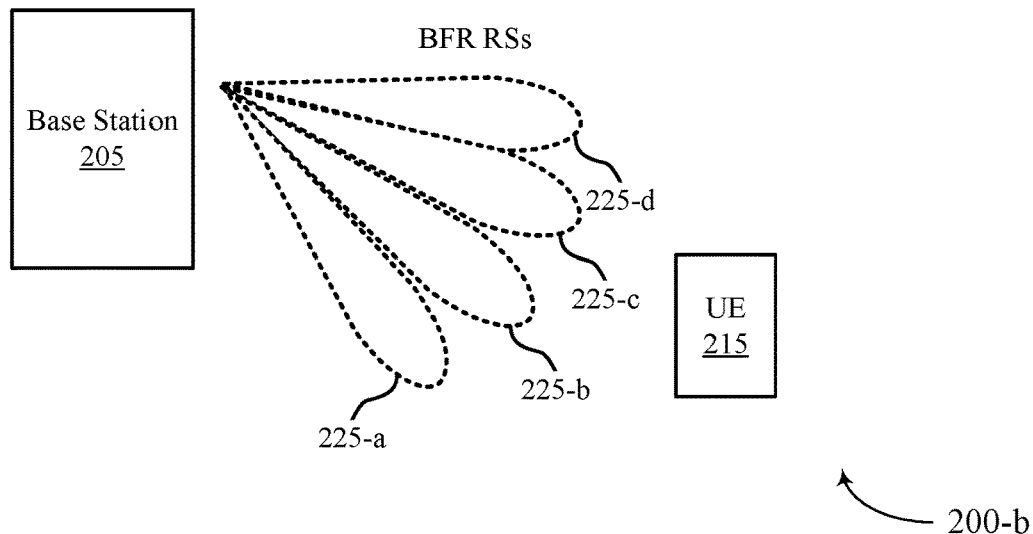
Figure 2C:
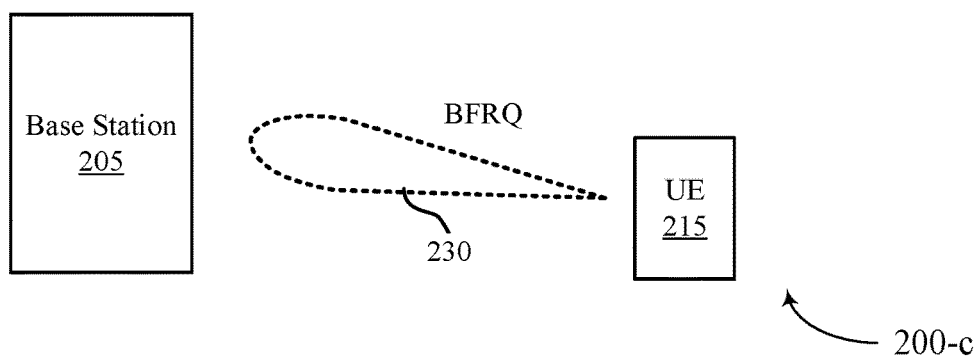

FIGS. 2A-2C illustrate examples of a wireless communication system 200 that supports on-demand BFR resources in accordance with one or more aspects of the present disclosure. In some examples, wireless communication system 200 may implement aspects of wireless communication system 100. Aspects of wireless communication system 200 may be implemented by a base station 205 and/or a UE 215, which may be examples of the corresponding devices described herein.

Base station 205 may be communicating with UE 215 using beam 210 and UE 215 may be communicating with base station 205 using beam 220. In some aspects, beam 210 and/or 220 may be considered an active beam or beam pair. That is, beam 210 may be an active transmit beam and/or an active receive beam used by base station 205 to perform wireless communications with UE 215. Similarly, beam 220 may be an active transmit beam and/or an active receive beam used by UE 215 perform wireless communications with base station 205.

In some aspects, techniques may include BFR resources being preconfigured for base station 205 and UE 215. For example, because both the base station 205 and the UE 215 may be unaware of when a communication failure will happen and to reduce overhead, the periods of beam failure indication (BFI) reporting and/or contention free random access (CFRA) random access channel (RACH) resource may be sufficiently long to enable accurate detection and recovery of a communication failure. For example, BFI reporting periodicity may be at least 2 ms, the RACH resource periodicity may be at least 10 ms, there may be 4 slots between a RACH transmission slot and the response window start slot, and the like. In some aspects, the average BFR completion duration may be large (e.g., at least (BFI report periodicity)/2+(RACH resource period)/2+4 slots=6.5 ms). This may assume that the beam failure discovery (BFD) reference signal period is at most 2 ms, a maximum count of BFI's of one, a latency for BFI report to a next candidate beam reference signal being negligible, the response window duration is one slot, and that the procedure, from the preamble transmission to the response reception, was successful (e.g., there was an absence of errors from the preamble transmission to the response reception). Latency may be further increased where retransmission is involved. However, this approach, in addition to increased latency, may be wasteful in that the resources configured for the communication recovery may go unused in the absence of a communication failure recovery procedure (e.g., when communication is successful).

Accordingly, aspects of the described techniques may include BFR resources being implicitly configured in the current communication period/cycle based on the communication results in a previous communication period/cycle (e.g., whether or not the previous communication period/cycle experiences a communication failure). A communication period/cycle may be considered to have failed if a packet being communicated in at least one direction (e.g., uplink and/or downlink) fails to be successfully received and decoded. In some examples, this may include any retransmissions of the failed packet. In some aspects, a communication failure of a communication period/cycle may indicate that a beam failure has occurred (e.g., which may include a loss of all active control beams within a cell) and/or a radio link failure (e.g., which may include the whole cell failing, such as a complete loss of communications between the cell and the UE 215).

In some aspects, the communication period/cycle may refer to any time frame in which communications are performed between base station 205 and UE 215. For example, based on periodic traffic, base station 205 and/or UE 215 may be in sync with regards to expected communications (e.g., for an initial transmission and/or a retransmission) such that a communication failure within a communication period/cycle is known or can otherwise be detected by each device.

In some aspects, this may include a resource (e.g., time resource(s), frequency resource(s), spatial resource(s), code resource(s), and the like, alone or in any combination) being configured for base station 205 and UE 215. For example, base station 205 may transmit a signal (e.g., an RRC signal, a MAC control element (CE), and the like) to UE 215 that configures the resource. However, the resource may be configured in a first state where the resource is active for wireless communications between base station 205 and UE 215, but is inactive for a communication failure recovery procedure. That is, the resource may be available to use for ongoing communications between base station 205 and UE 215 over beams 210 and 220, respectively, but may be dynamically activated (e.g., transitioned to a second state) upon detecting or otherwise determining that a communication failure has occurred during a first communication period/cycle. In the second state, the resource may be inactive for wireless communications, but active for the communication failure recovery procedure. Accordingly, base station 205 and UE 215 may transition the resource to the second state in response to a communication failure, and use the resource during a communication failure recovery procedure to identify a new candidate beam to use for future communications. That is, the new beam identified in the communication period/cycle in which the communication failure recovery procedure occurs may be applied to the following communication period/cycle.

Accordingly and with reference to FIG. 2A, base station 205 and UE 215 may identify a resource for wireless communications, with the resource being in the first state. The wireless communications may include base station 205 communicating with UE 215 over beam 210 (e.g., a currently active transmit and/or receive beam of base station 205) and UE 215 communicating with base station 205 over beam 220 (e.g., a currently active transmit and/or receive beam of UE 215).

In some aspects, base station 205 and/or UE 215 may determine that a communication failure has occurred during a first communication period/cycle. As discussed, the communication failure may refer to a beam failure (e.g., a loss of control beams of base station 205) and/or a radio link failure (e.g., a complete loss of communications between base station 205 and UE 215). The first communication period/cycle may refer to any time period in which an expected communication of information (uplink and/or downlink) occurs between base station 205 and UE 215. In one non-limiting example, this may include UE 215 failing to transmit an initial transmission and/or retransmission and/or base station 205 failing to receive the initial transmission and/or retransmission. For example, UE 215 may fail to transmit and/or base station 205 may fail to receive a downlink ACK transmission and/or an uplink packet transmission.

Accordingly, in some examples base station 205 and UE 215 may both detect or otherwise determine that the communication failure has occurred. In response, base station 205 and UE 215 may both transition the resource to a second state where the resource is inactive for wireless communications, but is active for the communication failure recovery procedure. That is, upon detecting the communication failure, base station 205 and UE 215 may identify the preconfigured resources associated with the communication failure recovery procedure (but available to use for wireless communications while in the first state) and transition those resources to the second state where they are available or otherwise active to use for a communication failure recovery procedure. Base station 205 and UE 215 may perform the communication failure recovery procedure using the resource transitioned to the second state.

For example and with reference to FIG. 2B, this may include base station 205 using the resource transitioned to the second state to transmit one or more BFR candidate beam reference signals (RSs) 225. In some aspects, this may include base station 205 transmitting the BFR candidate beam RSs 225 in a sweeping manner (e.g., in a plurality of directions). For example, base station 205 may transmit BFR candidate beam RS 225-*a* in a first direction, BFR candidate beam RS 225-*b* in a second direction, BFR candidate beam RS 225-*c* in a third direction, and BFR candidate beam RS 225-*d* in a fourth direction. In one non-limiting example, this may include base station 205 using a set of candidate beams maintained for UE 215, such as the the top four, six, etc. candidate beams associated with UE 215. It is to be understood that more or fewer BFR candidate beam RSs 225 may be transmitted.

In some aspects, UE 215 may, based on determining that the communication failure has occurred, monitor the resource transitioned to the second state in order to receive one or more of the BFR candidate beam RSs 225. For example, UE 215 may use one or more receive beams to measure a quality (e.g., a received signal strength) of the BFR candidate beam RSs 225 to identify a preferred candidate beam from the BFR candidate beam RSs 225. For example, UE 215 may identify the best candidate beam and/or top N candidate beams from the BFR candidate beam RSs 225, where N is a positive integer of two or more.

With reference to FIG. 2C, base station 205 may transmit a BFR request signal (BFRQ) to base station 205 that carries or otherwise conveys an indication identifying a preferred candidate beam (e.g., the best candidate beam or top N candidate beams) from the BFR candidate beam RSs 225. In some aspects, the BFRQ may be transmitted using a beam 230 which may, in some examples, correspond to the preferred candidate beam.

Accordingly, base station 205 may receive the BFRQ and identify the preferred candidate beam indicated by UE 215. Base station 205 may use this beam as its new active beam in wireless communications with UE 215. That is, base station 205 may receive the BFRQ and identify the best candidate beam (or top N candidate beams) that UE 215 received from base station 205. Base station 205 may adopt or otherwise select the preferred candidate beam identified in the BFRQ and select this as the new active beam to use for communicating with UE 215. Similarly, UE 215 may select the preferred candidate beam (e.g., beam 230) to use for communications with base station 205. Upon successful completion of the BFR procedure, base station 205 and UE 215 may transition the resource back to the first state where the resource is active for wireless communications between base station 205 and UE 215. That is, upon base station 205 receiving the BFRQ and identifying the new active beam to use for communicating with UE 210, base station 205 and UE 215 may refrain from using the resource for a communication failure recovery procedure, and may therefore transition the resource back to the first state where it is available for wireless communications between base station 205 and UE 215, but inactive for a communication failure recovery procedure.

In some aspects, the one or more BFR candidate beam RSs 225 may be common to all UEs (since it is beam-swept) while the uplink resource (e.g., for the BFRQ using beam 230) may be separately configured on a per-UE basis or an implicitly derived configuration based on a UE's downlink and/or uplink assignment. In some aspects, there may also be an explicit but perhaps longer-period BFRQ resource configured, where the implicit triggering might be suspended in the slots/frames where the explicit resource is configured.

Accordingly, aspects of the described techniques provide a mechanism whereby a resource is preconfigured for a communication failure recovery procedure, but is in an inactive state until the communication failure occurs. Instead, the resource is available for use during normal wireless communications between base station 205 and UE 215, and thus reduces the resource inefficiency associated with having preconfigured communication failure recovery resources that are active.

Figure 3:
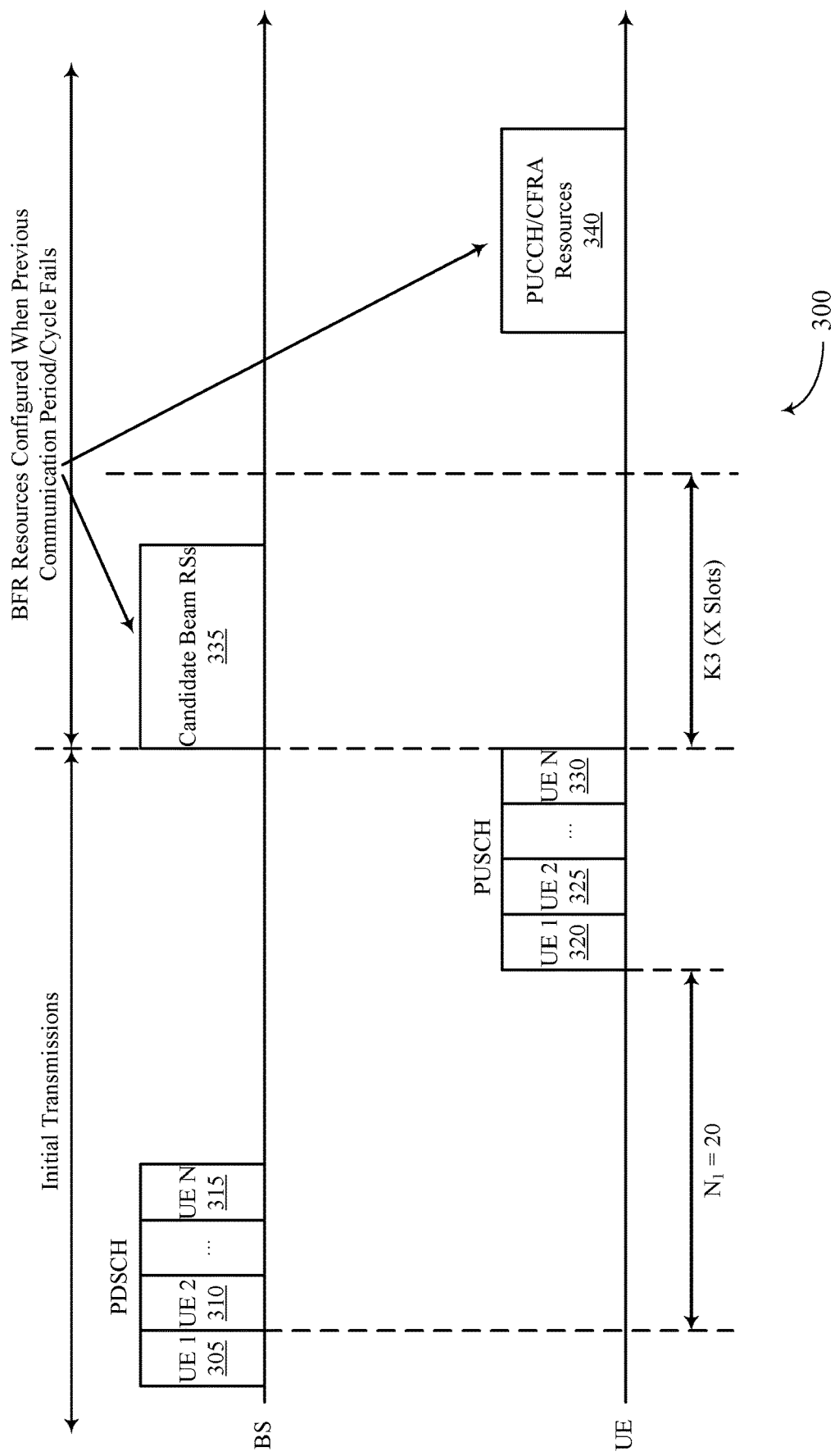
FIG. 3 illustrates an example of a BFR configuration that supports on-demand BFR resources in accordance with one or more aspects of the present disclosure.

FIG. 3 illustrates an example of a BFR configuration 300 that supports on-demand BFR resources in accordance with one or more aspects of the present disclosure. In some examples, BFR configuration 300 may implement aspects of wireless communication systems 100 and/or 200. Aspects of BFR configuration 300 may be implemented by a base station and/or a UE, which may be examples of the corresponding devices described herein. In some aspects, the base station and/or UE may be examples of a wireless device implementing aspects of the described techniques.

In some aspects, the base station may be performing wireless communications with one or more UEs, with N UEs being shown by way of example only and N corresponding to a positive integer of one or more. In the example illustrated in BFR configuration 300, this may include the base station performing a downlink transmission 305 to UE 1, a downlink transmission 310 to UE 2, and continuing with downlink transmissions until downlink transmission 315 to UE N. Although BFR configuration 300 illustrates such downlink transmissions as being data transmissions (e.g., PDSCH), it is to be understood that the downlink transmissions may be any combination of control, system, and/or data being communicated to the respective UE.

In some aspects, the wireless communications may include one or more uplink transmissions from N UEs to the base station. For example, this may include a first uplink transmission 320 from UE 1, a second uplink transmission 325 from UE 2, and continuing with uplink transmissions until uplink transmission 330 from UE N. Again, although BFR configuration 300 illustrates such uplink transmissions as being data transmissions (e.g., physical uplink shared channel (PUSCH)), it is to be understood that the uplink transmissions may be any combination of control, system, and/or data being communicated to the base station.

In one example, the uplink communications may include ACK/negative-acknowledgement (ACK/NACK) uplink transmissions from the UEs in response to the downlink transmissions from the base station. In this example, the ACK/NACK uplink transmissions may occur a defined time period after the corresponding downlink transmission, with $N_1=20$ being shown by way of example only where $N_1$ is the number of symbols between the downlink transmission and the corresponding ACK/NACK uplink transmission.

Although not illustrated in BFR configuration 300, it is to be understood that the uplink and/or downlink transmissions may include one or more of initial transmissions and/or retransmissions of information between the base station and respective UEs.

The uplink and/or downlink transmissions (e.g., the initial transmissions) may occur during a first communication period (or communication cycle). A communication period/cycle may refer to any time period in which communications are expected to occur, including uplink transmissions and/or downlink transmissions. In other words, a communication period may refer to any time period (e.g., symbol(s), mini-slot(s), slot(s), subframe(s), etc.) in which a base station and/or a UE expect communications to occur. For example, a base station may expect an ACK/NACK transmission from the UE (e.g., a downlink ACK transmission) in response to a downlink transmission. Similarly, the base station may expect an uplink packet transmission from a UE (e.g., based on periodic communications performed between the base station and UE) based on the scheduling request received from the UE, and the like. Similarly, the UE may expect communications from a base station according to periodically occurring communications from the base station, an indication of pending communications from the base station, and the like.

In some aspects, one or more of the wireless communications between the base station the UE may occur over a resource that is configured or otherwise operating in a first state. The resource may refer to any combination of time resource(s), a frequency resource(s), spatial resource(s), a code resource(s), and the like. The resource configured in the first state may mean that the resource is available to use for wireless communications between the base station and UE. For example one or more of the downlink transmissions 305, 310, and/or 315 may be performed using some or all the resource in the first state. Similarly, one or more of the uplink transmissions 320, 325, and/or 330 may be formed using some or all of the resources in the first state. Thus, the resource in the first state may be active or otherwise available for use by the base station and/or the UE in performing wireless communications.

In some aspects, the resources in the first state may be inactive or otherwise unavailable for a communication failure recovery procedure. That is, the resource may be allocated or otherwise identified for use in a communication failure recovery procedure, but are in active for such communication failure recovery procedure until a communication failure occurs.

In some aspects, the resource may be preconfigured before the communication failure occurs. For example, the base station may transmit a signal to a UE configuring the resource in the first state. Examples of the signal may include, but are not limited to, an RRC signal, a MAC CE, an initial configuration signal, and the like.

Accordingly, the base station and UEs may identify the resource for wireless communication, with the resource being in the first state. However, the base station and/or the UE may determine that a communication failure has occurred during the first communication period (e.g., during one or more of the initial transmissions and/or retransmissions). The communication failure may refer to a beam failure and/or a radio link failure. In some examples, the beam failure may refer to a loss or failure to communicate on one or more of the control beams of the base station. In some examples, the radio link failure may refer to a loss of communication between the base station and the UE (e.g., such that communications are unable to be performed between the base station and the UE).

Accordingly, the base station and the UE may transition the resource from the first state to a second state in response to the communication failure. In the second state, the resource may be inactive for wireless communications, but may be active for a communication failure recovery procedure. That is, the resource in the first state used for wireless communications between the base station and UE may be dynamically transitioned or otherwise repurposed to a second state where the resource is available for use in a communication failure recovery procedure upon detecting the communication failure between the base station and UE. In some aspects, this may minimize waste by having communication failure recovery procedure resources being configured and available for use.

In some aspects, the base station and the UE may perform the communication failure recovery procedure using the resource that has been transitioned to the second state (e.g., using the resource that is activated for the communication failure recovery procedure in response to detecting the communication failure). In some aspects, this may include the base station transmitting (and the UE receiving) one or more BFR candidate beams RSs 335 using the resources transitioned to the second state. For example, the base station may transmit the one or more BFR candidate beam RSs 335 in a sweeping manner across at least a portion of its coverage area to improve reception by the UE. In some aspects, the base station may transmit the one or more BFR candidate beam RSs 335 for a defined period, with K3 (covering X slots) being shown by way of example only, where X is a positive integer of one or more.

In some aspects, based on detecting or otherwise determining that a communication failure has occurred, the UE may monitor for the BFR candidate beam RSs 335 to determine or otherwise identify a preferred candidate beam to use for future communications with the base station. For example, the UE may identify the best candidate beam from the BFR candidate beam RSs 335 and/or may identify the top N candidate beams from the BFR candidate beam RSs 335, with N being a positive integer of 2 or more.

In some aspects, the UE may transmit a BFRQ 340 to the base station, with the BFRQ 340 transmitted using one or more of the resources transitioned to the second state. In the example illustrated in BFR configuration 300, this may include one or more physical uplink control channel (PUCCH) and/or CFRA resources. In some aspects, the BFRQ 340 may carry or otherwise convey an indication identifying a preferred candidate beam (e.g., the best candidate beam and/or the top N candidate beams). The base station may receive the BFRQ 340, identify the preferred candidate beam, and select this beam to use for continuing communications with the UE.

As discussed, aspects of the described techniques may include the UE and the base station determining that the communication failure has occurred. Examples of the communication failure may include, but are not limited to, the UE assuming that the on-demand BFR is configured (e.g., the communication failure has occurred, and therefore the resource is transitioned to the second state) if the UE refrains from transmitting at least one of a downlink ACK and/or an uplink packet in the previous cycle (e.g., during the first communication period). Another example of the communication failure may include, but is not limited to, the base station assuming that the BFR is configured (e.g., the communication failure has occurred, and therefore the resource is transitioned to the second state) if the base station fails to receive at least one of the downlink ACK and/or the uplink packet in the previous cycle (e.g., during the first communication period).

In some situations, there may be misalignment between the UE and the base station (e.g., one wireless device may detect the communication failure, but the other wireless device may fail to detect the communication failure). Table 1 below illustrates the example alignment scenarios (in terms of whether each wireless device determines or otherwise identifies the communication failure).

TABLE 1

Alignment Scenarios

|  |  | At the Base Station Side | |
|---|---|---|---|
|  |  | Both DL ACK/UL packet are received in first communication period/cycle | At least one of DL ACK/UL packet fail to be received in first communication period/cycle |
| At the UE side | Both DL ACK/UL packet are transmitted in the first communication period/cycle | UE & base station assume absence of a configured BFR (e.g., communication failure fails to be detected) | UE assumes absence of a configured BFR<br><br>BS assumes BFR configured |
|  | At least one of DL ACK/UL packet are fail to be transmitted in the first communication period/cycle | Possible NACK-to-ACK error | UE & base station assume BFR configured (e.g., communication failure is detected) |

As illustrated in Table 1, when both the downlink (DL) ACK and uplink (UL) packet are transmitted by the UE and received by the base station, both devices may determine that there has been an absence of a communication failure (e.g., the BFR resource remains in the first state). In the situation where the UE refrains from transmitting and the base station fails to receive at least one of the DL ACK and UL packet, both devices may determine that the communication failure has occurred (e.g., the BFR is configured, such that the resources are transitioned to the second state).

If PUSCH was sent but ACK was failed to be sent/received, especially with the ACK configured for PUCCH format 0 or format 2 for small packet (e.g., a Reed-Muller sequence, an absence of CRC, etc.), an NACK-to-ACK error may arise. In this situation, the UE may be transmitting on the BFR resource that it thinks has been reserved for a communication failure recovery procedure (e.g., the resource transitioned to the second state), but in fact the base station may have failed to activate this resource. One approach in this situation is for the base station to selectively configure the resource (e.g., configure the resource in the second state or otherwise available for the communication failure recovery procedure) when the base station suspects a potential NACK-to-ACK error. In some aspects, the ACK could be included with the UL packet (e.g., using uplink control information (UCI)-piggybacking), but may still be separately encoded. In some examples, in at least one of ACK and PUSCH, the ACK itself could be split into multiple bits for code block grouping (CBG)-based ACK, and the 'ACK never sent' scenario may mean that at least one CBG was never ACKd, or some threshold number or percentage of CBGs were never ACKd. More particular aspects of the misalignment scenarios between the base station and UE are described with reference to the drawings below.

Figure 4:
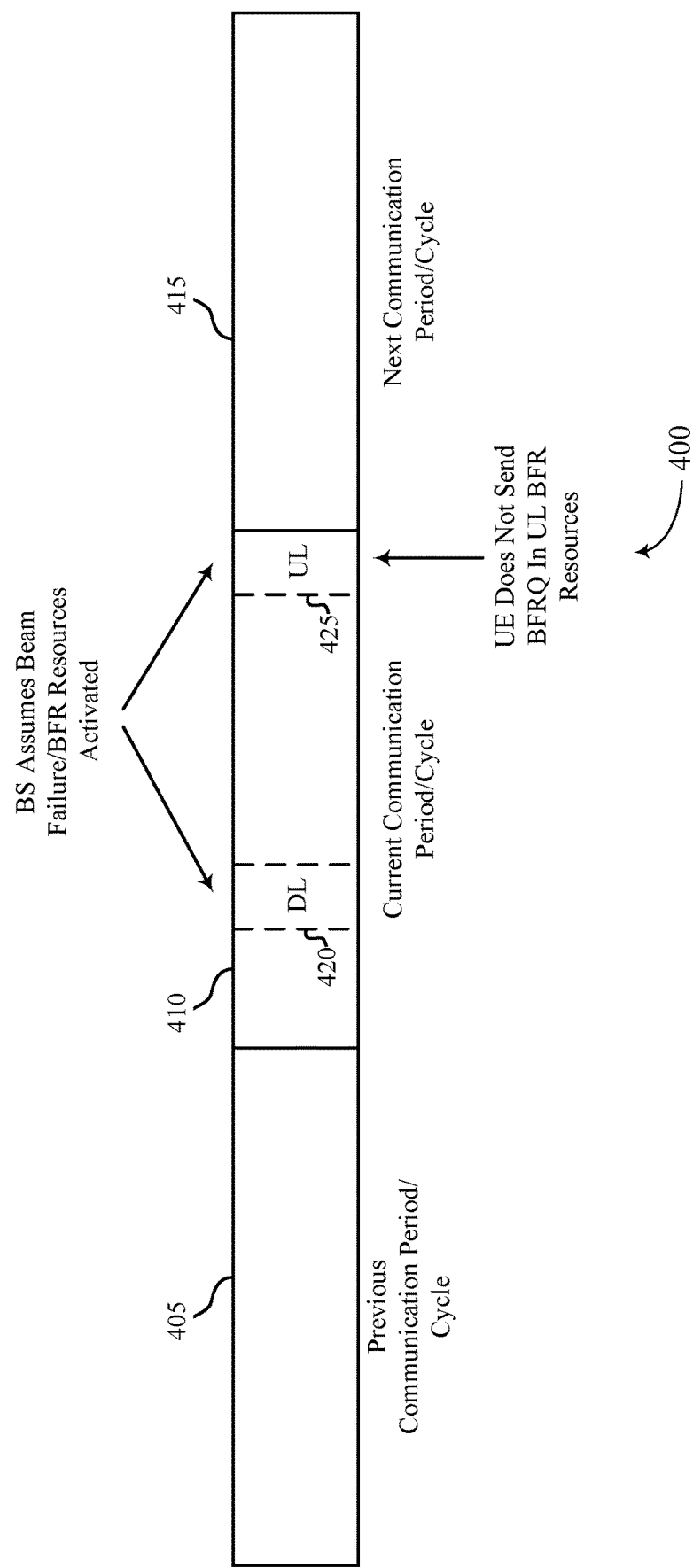
FIG. 4 illustrates an example of a BFR configuration that supports on-demand BFR resources in accordance with one or more aspects of the present disclosure.

FIG. 4 illustrates an example of a BFR configuration 400 that supports on-demand BFR resources in accordance with one or more aspects of the present disclosure. In some examples, BFR configuration 400 may implement aspects of wireless communication systems 100, 200, and/or BFR configuration 300. Aspects of BFR configuration 400 may be implemented by a base station and/or UE, which may be examples of corresponding devices described herein.

BFR configuration 400 may include a previous communication period/cycle 405 (e.g., a first communication period), a current communication period/cycle 410 (e.g., a second communication period), and a next communication period/cycle 415 (e.g., a third communication period). BFR configuration 400 illustrates the example situation where there is a misalignment between the base station the UE with respect to whether or not the communication failure has occurred. More particularly, BFR configuration 400 illustrates the case with misaligned assumption when the UE sends both downlink ACK and an uplink packet during the previous communication period/cycle 405, but the base station never receives at least one of the DL ACK or uplink packet. In this situation, the base station may determine that the communication failure has occurred, but the UE may determine that the communication was successful. That is, in this case the UE may assume an absence of a configured BFR procedure (e.g., the UE may assume that the resource is in the first state), but the base station may assume that there is a configured BFR procedure (e.g., the base station may assume that the resource is in the second state) in the current communication period/cycle 410.

Accordingly, the base station may transmit one or more BFR candidate beam RSs in a downlink transmission 420 because the base station has determined that a communication failure has occurred during the previous communication period/cycle 405. However, the UE, failing to determine that the communication failure has occurred, may refrain from monitoring for the BFR candidate beam RSs and/or may refrain from sending the BFRQ in an uplink transmission 425 during the current communication period/cycle 410. In this context, the communication failure recovery procedure using the resources transitioned to the second state (at least from the base station perspective) may be considered unsuccessful in that base station fails to receive and/or the UE fails to transmit the BFRQ in the uplink BFR resources.

Based on the base station failing to receive the BFRQ, the base station may determine that the UE has failed to identify the communication failure, and therefore may continue using the previous active beam for communications with the UE during the next communication period/cycle 415. That is, the base station and the UE may avoid beam misalignment because both sides (e.g., the base station and the UE) may continue to use the same beam (e.g., the beam used for the initial transmissions/retransmissions during the previous communication period/cycle 405) in the next communication period/cycle 415.

Figure 5:
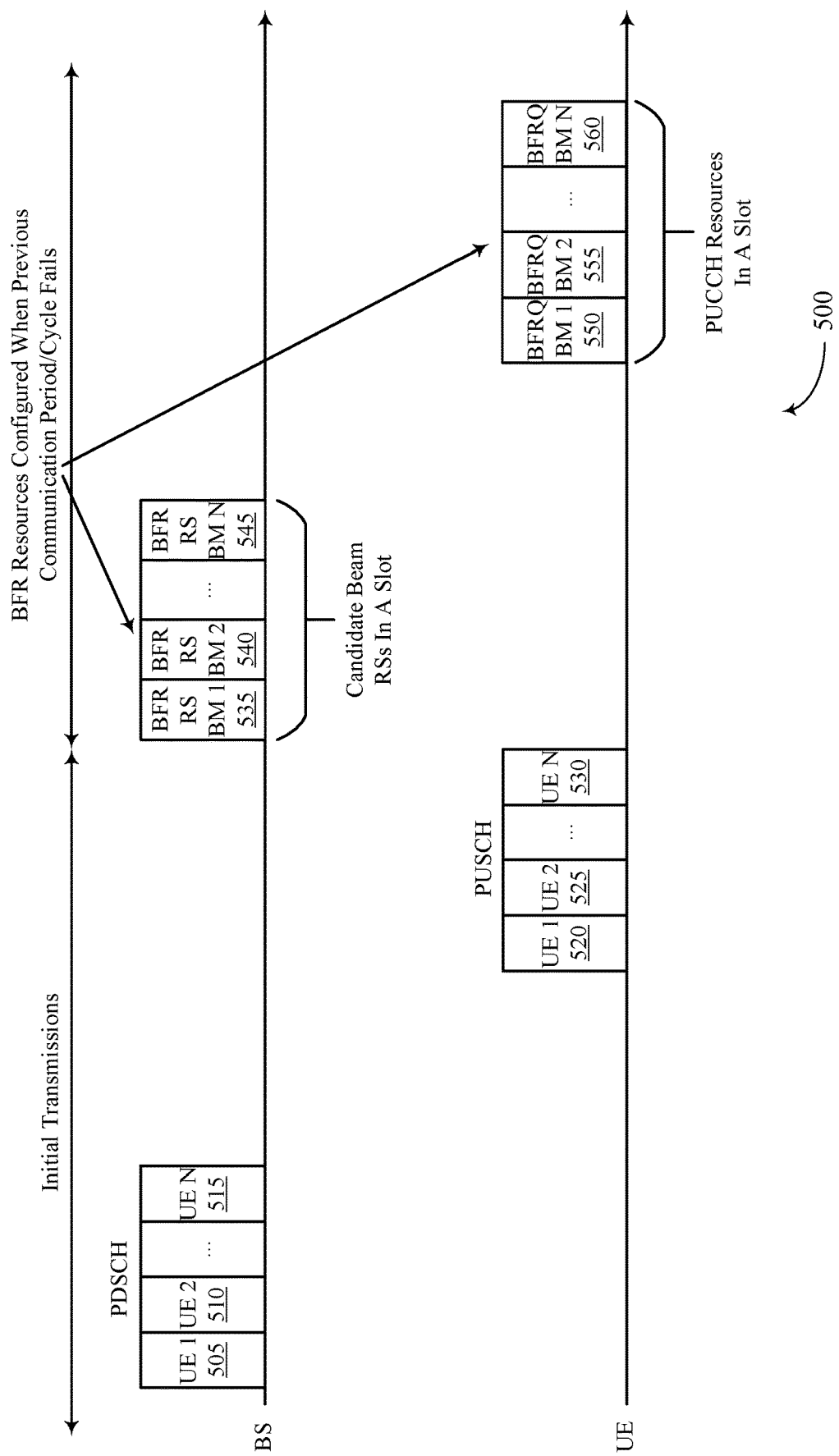
FIG. 5 illustrates an example of a BFR configuration that supports on-demand BFR resources in accordance with one or more aspects of the present disclosure.

FIG. 5 illustrates an example of a BFR configuration 500 that supports on-demand BFR resources in accordance with one or more aspects of the present disclosure. In some examples, BFR configuration 500 may implement aspects of wireless communication systems 100, 200, and/or BFR configurations 300 and/or 400. Aspects of BFR configuration 500 may be implemented by a base station and/or a UE, which may be examples of the corresponding devices described herein. In some aspects, the base station and/or UE may be examples of a wireless device implementing aspects of the described techniques.

In some aspects, the base station may perform wireless communications with one or more UEs, with N UEs being shown by way of example only and N corresponding to a positive integer of one or more. In the example illustrated in BFR configuration 500, this may include the base station performing a downlink transmission 505 to UE 1, a downlink transmission 510 to UE 2, and continuing with downlink transmissions until downlink transmission 515 to UE N. Although BFR configuration 500 illustrates such downlink transmissions as being data transmissions (e.g., PDSCH), it is to be understood that the downlink transmissions may be any combination of control, system, and/or data being communicated to the respective UE.

In some aspects, the wireless communications may include one or more uplink transmissions from N UEs to the base station. For example, this may include a first uplink transmission 520 from UE 1, a second uplink transmission 525 from UE 2, and continuing with uplink transmissions until uplink transmission 530 from UE N. Again, although BFR configuration 500 illustrates such uplink transmissions as being data transmissions (e.g., PUSCH), it is to be understood that the uplink transmissions may be any combination of control, system, and/or data being communicated to the base station.

Although not illustrated in BFR configuration 500, it is to be understood that the uplink and/or downlink transmissions may include one or more of initial transmissions and/or retransmissions of information between the base station and respective UEs.

The uplink and/or downlink transmissions (e.g., the initial transmissions) may occur during a first communication period (or communication cycle). A communication period may refer to any time period in which communications are expected to occur, including uplink transmissions and/or downlink transmissions.

In some aspects, one or more of the wireless communications between the base station the UE may occur over a resource that is configured or otherwise operating in a first state. The resource may refer to any combination of time resource(s), a frequency resource(s), spatial resource(s), a code resource(s), and the like. The resource configured in the first state may mean that the resource is available to use for wireless communications between a base station and a UE. For example one or more of the downlink transmissions 505, 510, and/or 515 may be performed using some or all the resource in the first state. Similarly, one or more of the uplink transmissions 520, 525, and/or 530 may be performed using some or all of the resources in the first state. Thus, the resource in the first state may be available for use by the base station and/or UE for performing wireless communications.

In some aspects, the resources in the first state may be inactive or otherwise unavailable for a communication failure recovery procedure. That is, the resources may be allocated or otherwise identified for use in a communication failure recovery procedure, but are inactive for such communication failure recovery procedure until a communication failure occurs.

In some aspects, the resources may be preconfigured before a communication failure occurs. For example, the base station may transmit a signal to a UE configuring the resource in the first state. Examples of the signal may include, but are not limited to, an RRC signal, a MAC CE, an initial configuration signal, and the like.

Accordingly, the base station and UEs may identify the resource for wireless communication, with the resource being in the first state. However, the base station and/or the UE may determine that a communication failure has occurred during the first communication period (e.g., during one or more of the initial transmissions/retransmissions). The communication failure may refer to a beam failure and/or a radio link failure.

Accordingly, the base station and the UE may transition the resource from the first state to a second state in response to the communication failure. In the second state, the resource may be inactive for wireless communications, but may be active for a communication failure recovery procedure. That is, the resource in the first state used for wireless communications between the base station and UE may be dynamically transitioned or otherwise repurposed to use for a communication failure recovery procedure upon detecting a communication failure between the base station and UE. In some aspects, this may minimize resource inefficiency caused by having communication failure recovery procedure resources being configured and available for use.

In some aspects, the base station and the UE may perform the communication failure recovery procedure using the resource that has been transitioned to the second state (e.g., using the resource that is activated for the communication failure recovery procedure in response to detecting the communication failure). In some aspects, this may include the base station transmitting (and the UE receiving) one or more BFR candidate beams RSs using the resource transitioned to the second state. For example, the base station may transmit the one or more BFR candidate beam RSs in a sweeping manner across at least a portion of its coverage area using different transmit beams. For instance, the base station may transmit a first BFR candidate beam RS 535 on beam 1, a second BFR candidate beam RS 540 on beam 2, and continuing until and Nth BFR candidate beam RS 545 on beam N, with N being a positive integer of one or more. In some aspects, each beam used to transmit the BFR candidate beam RS may be unique (e.g., may have a unique identifier assigned) and/or may be transmitted in a different direction (e.g., in a sweeping manner). In some aspects, each BFR candidate beam RS may be transmitted in one symbol (e.g., the CSI-RS), and may have a corresponding uplink resource with an identical base station beam for transmit and receive. For example, each uplink resource may be one symbol PUCCH (e.g., format 0 or 2).

In some aspects, based on detecting or otherwise determining that a communication failure has occurred, the UE may monitor for the BFR candidate beam RSs to determine or otherwise identify a preferred candidate beam to use for future communications with the base station. For example, the UE may identify the best candidate beam from the BFR candidate beam RSs and/or may identify the top N candidate beams from the BFR candidate beams RSs, with N being a positive integer of 2 or more.

In some aspects, the UE may transmit a BFRQ to the base station using one or more of the resources transitioned to the second state. In the example illustrated in BFR configuration 500, this may include one or more PUCCH resources in a slot. In some aspects, the BFRQ may carry or otherwise convey an indication identifying a preferred candidate beam (e.g., the best candidate beam and/or the top N candidate beams).

As discussed, in some examples each beam used to transmit a BFR candidate beam RS may have a corresponding uplink resource used to transmit the BFRQ to the base station. For example, a first BFRQ 550 may correspond to the first BFR candidate beam RS 535 using beam 1, the second BFRQ 555 may correspond to the second BFR candidate beam RS 540 using beam 2, and the Nth BFRQ 560 may correspond to the Nth BFR candidate beam RS 545 using beam N. Accordingly, in some aspects the UE may select an uplink resource from the resource transitioned to the second state based on its preferred candidate beam. For example, the UE may transmit the first BFRQ 550 to the base station using beam 1 when the first BFR candidate beam RS 535 is the preferred candidate beam. Accordingly, the base station may know or otherwise identify the preferred candidate beam from the BFRQ received from the UE based on which beam the BFRQ is transmitted on.

Moreover, in some examples, the base station may receive multiple BFRQs from different UEs. In this context, the different UEs may be differentiated using unique initial cyclic shifts, frequency allocations, and the like, that are associated with each UE. Accordingly, the base station may receive the BFRQ, identify the preferred candidate beam of the UE, and select this beam to use for continuing communications with the UE. In some aspects, the base station may avoid using the resource in the first state when scheduling retransmissions (e.g., when practical from the perspective of the base station and/or UE).

Figure 6:
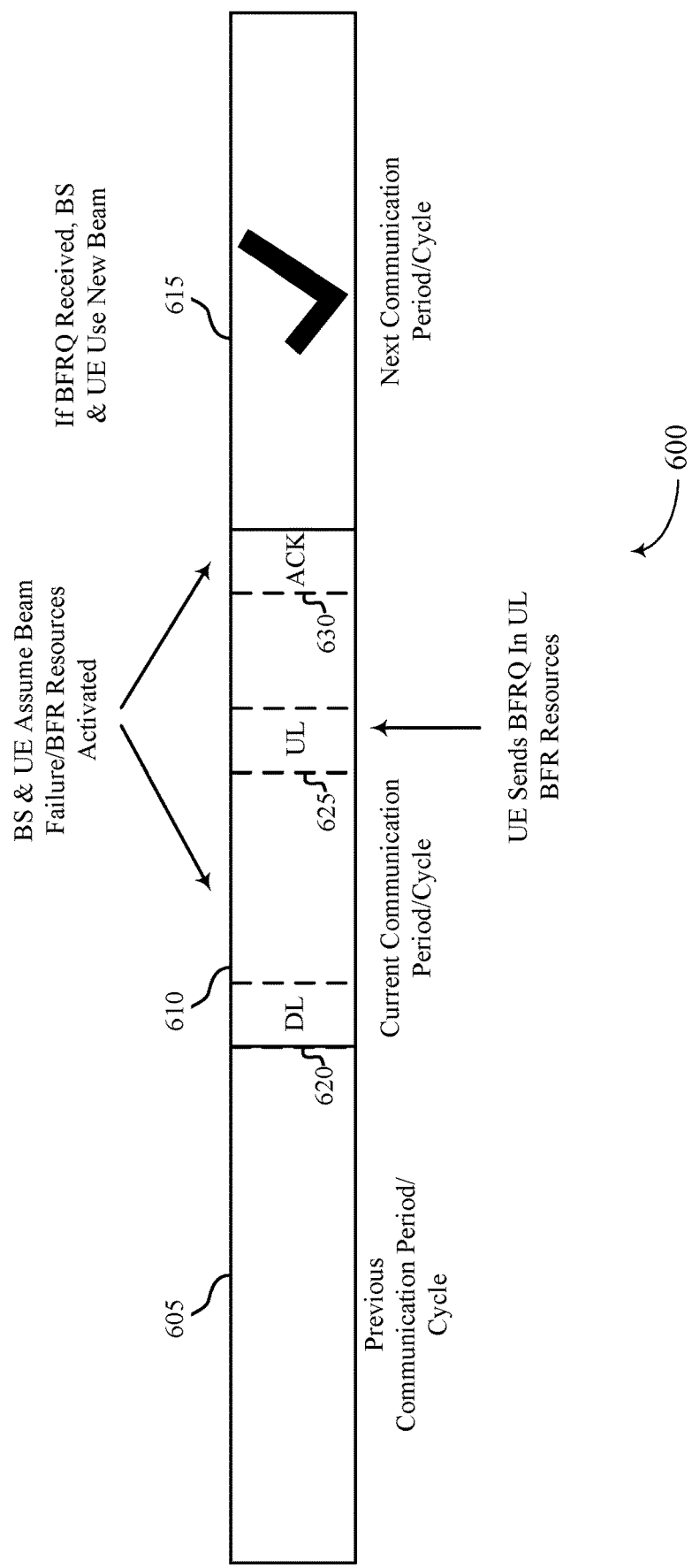
FIG. 6 illustrates an example of a BFR configuration that supports on-demand BFR resources in accordance with one or more aspects of the present disclosure.

FIG. 6 illustrates an example of a BFR configuration 600 that supports on-demand BFR resources in accordance with one or more aspects of the present disclosure. In some examples, BFR configuration 600 may implement aspects of wireless communication systems 100, 200, and/or BFR configurations 300, 400, and/or 500. Aspects of BFR configuration 600 may be implemented by a base station and/or UE, which may be examples of corresponding devices described herein.

BFR configuration 600 may include a previous communication period/cycle 605 (e.g., a first communication period), a current communication period/cycle 610 (e.g., a second communication period), and a next communication period/cycle 615 (e.g., a third communication period). BFR configuration 600 illustrates the example situation where the communication failure recovery procedure is successful, and optionally includes a base station acknowledging receipt of the BFRQ.

For example, the base station and the UE may perform wireless communications during the previous communication period/cycle 605. In some aspects, the wireless communications may be interrupted due to a communication failure detected or otherwise determined by the base station and UE. Accordingly, the base station and the UE may transition the resource from the first state to the second state such that the resource is active for a communication failure recovery procedure. The communication failure recovery procedure may be implemented or otherwise performed during the current communication period/cycle 610.

That is, the communication failure recovery procedure may include the base station transmitting one or more BFR candidate beam RSs in a downlink transmission 620 using the resources transitioned to the second state. The UE may monitor for the BFR candidate beam RSs to identify a preferred candidate beam (e.g., the best candidate beam or the top N candidate beams, with N being a positive integer value of 2 or more). The UE may transmit the BFRQ in an uplink transmission 625 using the resource transitioned to the second state. In some aspects, the BFRQ may carry or convey an indication identifying a best candidate beam of the UE.

The base station may receive the BFRQ from the UE and identify the best candidate beam. In some examples, the base station may optionally respond to the BFRQ by transmitting an ACK 630 to the UE that confirms receipt of the BFRQ. In some aspects, the ACK 630 may carry or convey an indication confirming the identity of the best candidate beam, may explicitly identify the best candidate beam from the BFRQ and/or may be communicated using a beam corresponding to the best candidate beam. In some aspects, the ACK 630 may be transmitted using the resource transitioned to the second state. Accordingly, the base station and the UE may select the best candidate beam as the new beam to use for wireless communications during the next communication period/cycle 615.

Thus, on the base station side if the BFRQ is detected, the base station will use the new beam for communicating all packets to the UE, unless reconfigured later. Otherwise, the base station will continue to use the old beam (e.g., as illustrated in BFR configuration 700). On the UE side, all packets will be received/sent by the new beam based on the BFRQ, unless reconfigured later.

Figure 7:
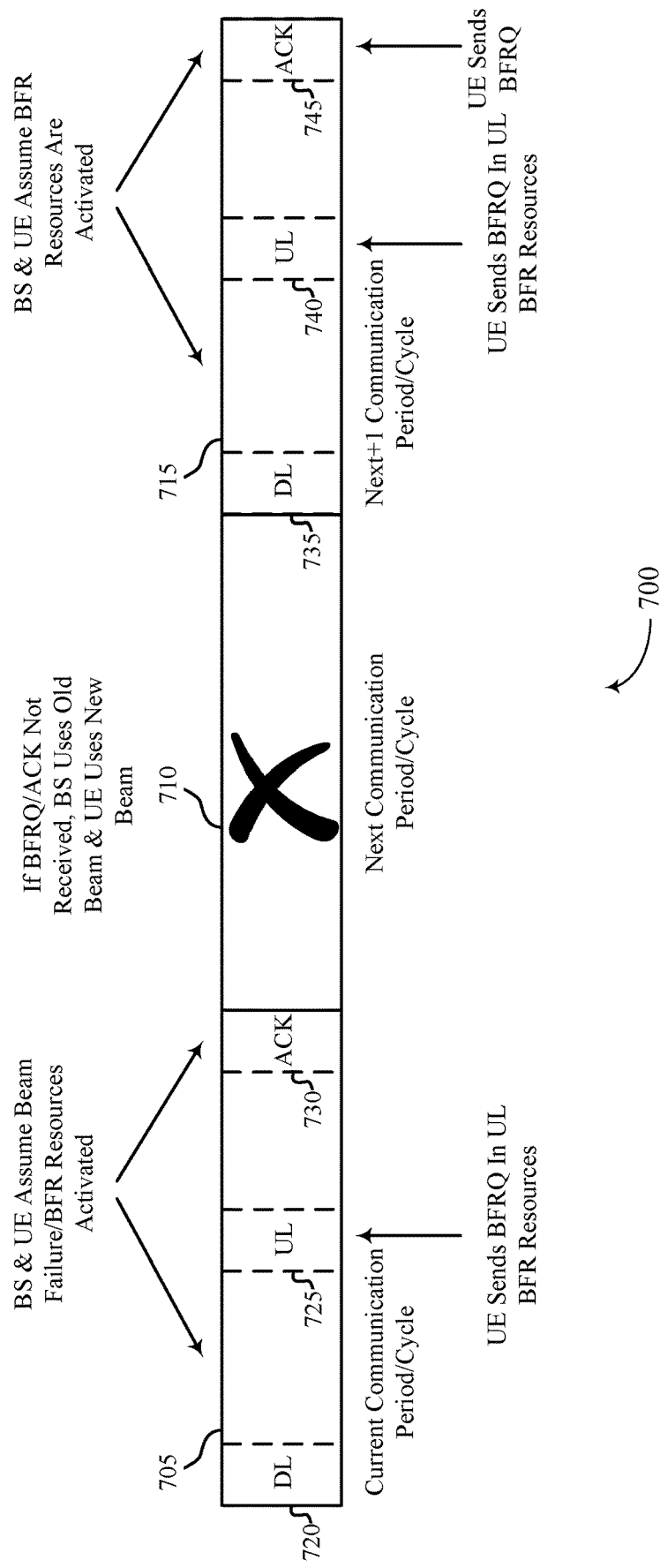
FIG. 7 illustrates an example of a BFR configuration that supports on-demand BFR resources in accordance with one or more aspects of the present disclosure.

FIG. 7 illustrates an example of a BFR configuration 700 that supports on-demand BFR resources in accordance with one or more aspects of the present disclosure. In some examples, BFR configuration 700 may implement aspects of wireless communication systems 100, 200, and/or BFR configurations 300, 400, 500 and/or 600. Aspects of BFR configuration 700 may be implemented by a base station and/or UE, which may be examples of corresponding devices described herein.

BFR configuration 700 may include a current communication period/cycle 705 (e.g., a second communication period), a next communication period/cycle 710 (e.g., a third communication period), and a next+1 communication period/cycle 715 (e.g., a fourth communication period). BFR configuration 700 illustrates the example situation where the communication failure recovery procedure is unsuccessful during the current communication period/cycle 705, but is successful during the next+1 communication period/cycle 715, and optionally includes a base station acknowledging receipt of the BFRQ.

For example, the base station and UE may be performing wireless communications during a previous communication period/cycle (not shown). In some aspects, the wireless communications may be interrupted due to a communication failure detected or otherwise determined by the base station and UE. Accordingly, the base station and the UE may transition the resource from the first state to the second state such that the resources are active for a communication failure recovery procedure. The communication failure recovery procedure may be implemented or otherwise performed during the current communication period/cycle 705.

That is, the communication failure recovery procedure may include the base station transmitting one or more BFR candidate beam RSs in a downlink transmission 720 using the resource transitioned to the second state. The UE may monitor for the BFR candidate beam RSs to identify a preferred candidate beam (e.g., the best candidate beam or the top N candidate beams, with N being a positive integer of two or more). The UE may transmit the BFRQ in an uplink transmission 725 using the resource transitioned to the second state. In some aspects, the BFRQ may carry or convey an indication identifying a best candidate beam of the UE.

The base station may receive the BFRQ from the UE and identify the best candidate beam. In some examples, the base station may optionally respond to the BFRQ by transmitting an ACK 730 to the UE that confirms receipt of the BFRQ. In some aspects, the ACK 730 may carry or convey an indication confirming the identity of the best candidate beam, may explicitly identify the best candidate beam from the BFRQ and/or may be communicated using a beam corresponding to the best candidate beam.

However, in the example BFR configuration 700, either the BFRQ and/or the ACK 730 may have failed to be communicated. For example, the UE may fail to transmit the BFRQ or the base station may fail to receive the BFRQ. Similarly, the base station may fail to transmit the ACK 730 or the UE may fail to receive the ACK 730. Accordingly, the base station may continue to use the old beam while the UE uses the new beam, or vice versa, for communications during the next communication period/cycle 710. This may again result in the base station and UE identifying a communication failure during the next communication period/cycle 710 (e.g., due to each wireless device using a different beam).

Accordingly, the base station and the UE may again transition the resource from the first state to the second state to use to perform a communication failure recovery procedure during the next+1 communication period/cycle 715. The communication failure recovery procedure may include the base station transmitting one or more BFR candidate beam RSs in a downlink transmission 735 using the resource transitioned to the second state. The UE may monitor for the BFR candidate beam RSs to identify a preferred candidate beam (e.g., the best candidate beam for the top N candidate beams, with N being a positive integer of two or more). The UE may transmit the BFRQ in an uplink transmission 740 using the resource transitioned to the second state. In some aspects, the BFRQ may carry or convey an indication identifying a best candidate beam of the UE.

The base station may receive the BFRQ from the UE and identify the best candidate beam. In some examples, the base station may optionally respond to the BFRQ by transmitting an ACK 745 to the UE that confirms receipt of the BFRQ. In some aspects, the ACK 745 may carry or convey an indication confirming the identity of the best candidate beam, may explicitly identify the best candidate beam from the BFRQ and/or may be communicated using a beam corresponding to the best candidate beam. Accordingly, the base station and the UE may select the best candidate beam as the new beam to use for wireless communications during subsequent communication periods/cycles (e.g., until another communication failure is detected).

Thus, if the BFRQ and/or ACK 730 fail to be successfully communicated between the base station and the UE, packets exchanged during the next communication period/cycle 710 may fail due to mismatched beams at both sides. The failure will trigger the BFR configuration in the next+1 communication period/cycle 715. The BFR configuration may also be available in the next communication period/cycle 710 if the current communication period/cycle 705 fails due to the use of old beams. The UE may attempt to retransmit the BFRQ in the earliest uplink BFR resource (e.g., until the exchange finally goes through or until additional mechanisms are activated).

Figure 8:
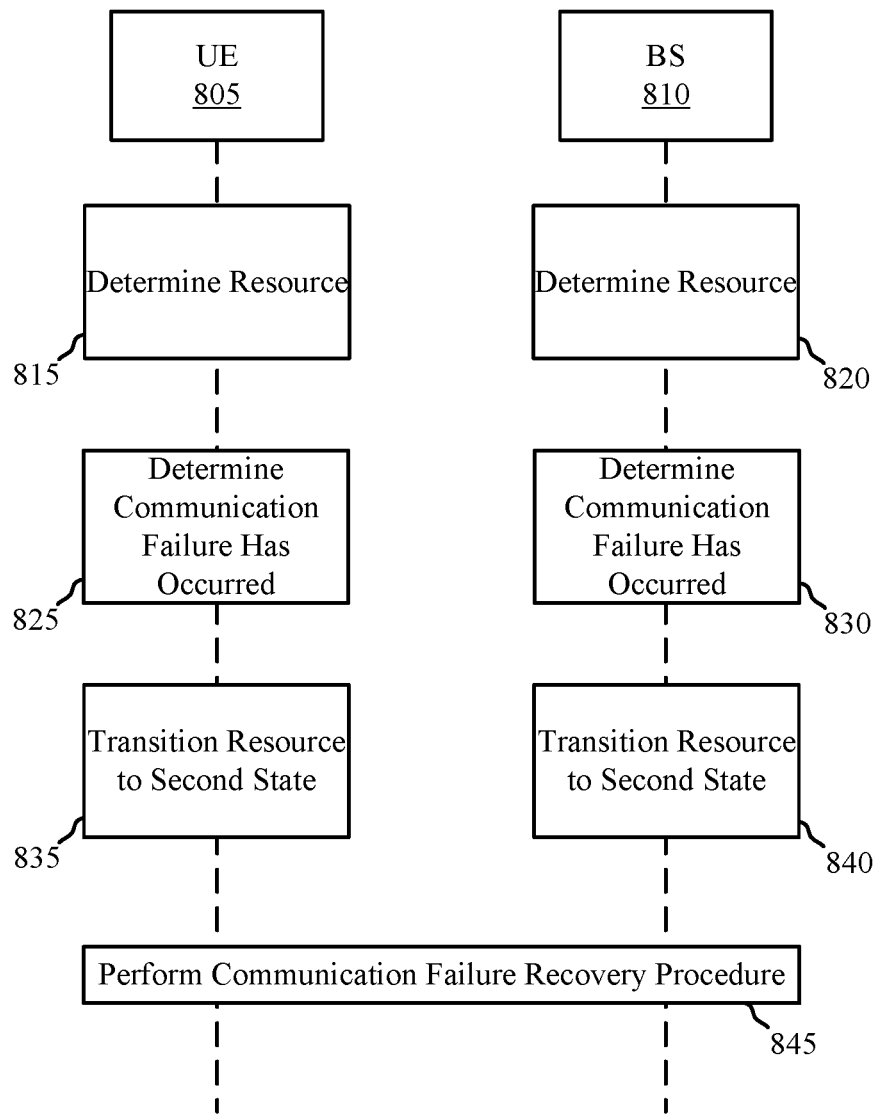
FIG. 8 illustrates an example of a process that supports on-demand BFR resources in accordance with one or more aspects of the present disclosure.

FIG. 8 illustrates an example of a process 800 that supports on-demand BFR resources in accordance with one or more aspects of the present disclosure. In some examples, process 800 may implement aspects of wireless communication systems 100, 200, BFR configurations 300, 400, 500, 600, and/or 700. Aspects of process 800 may be implemented by UE 805 and/or base station 810, which may be examples of corresponding devices described herein. In some aspects, UE 805 and/or base station 810 may be considered a wireless device in the context of the present disclosure.

At 815, UE 805 may determine a resource for wireless communication, the resource being in a first state where the resource is active for wireless communication and is inactive for a communication failure recovery procedure.

At 820, base station 810 may determine a resource for wireless communication, the resource being in a first state where the resource is active for wireless communication and is inactive for a communication failure recovery procedure.

At 825, UE 805 may determine that a communication failure has occurred during a first communication period. In some aspects, this may include determining that UE 805 failed to transmit an initial transmission and/or retransmission to base station 810 during the first communication period. In some aspects, the initial transmission and/or retransmission may include a downlink ACK transmission and/or an uplink packet transmission.

At 830, base station 810 may determine that a communication failure has occurred during a first communication period. In some aspects, this may include determining that base station 810 failed to receive an initial transmission and/or retransmission from UE 805 during the first communication period. In some aspects, the initial transmission and/or retransmission may include a downlink ACK transmission and/or an uplink packet transmission.

At 835, UE 805 may transition, during a second communication period and based at least in part on the communication failure, the resource to a second state where the resource is inactive for wireless communication and is active for the communication failure recovery procedure.

At 840, base station 810 may transition, during a second communication period and based at least in part on the communication failure, the resource to a second state where the resource is inactive for wireless communications and is active for the communication failure recovery procedure.

At 845, UE 805 and base station 810 may perform the communication failure recovery procedure using the resource transitioned to the second state. In some aspects, the communication failure recovery procedure may include a BFR and/or a radio link failure recovery.

In some aspects, this may include base station 810 transmitting (and UE 805 receiving) one or more BFR candidate beam RSs using the resource transitioned to the second state. In some aspects, this may include UE 805 transmitting (and base station 810 receiving) a BFR request signal (e.g., a BFRQ) identifying a preferred candidate beam associated with at least one of the one or more BFR candidate beam RSs. In some aspects, UE 805 and base station 810 may perform wireless communications during a third communication period using the best candidate beam identified in the BFR request signal.

In some aspects, this may include base station 810 determining that the BFR request signal failed to be received from UE 805 during the second communication period. Accordingly, base station 810 may perform wireless communications with UE 805 during a third communication period using the same beam as was used during the first communication period.

Figure 9:
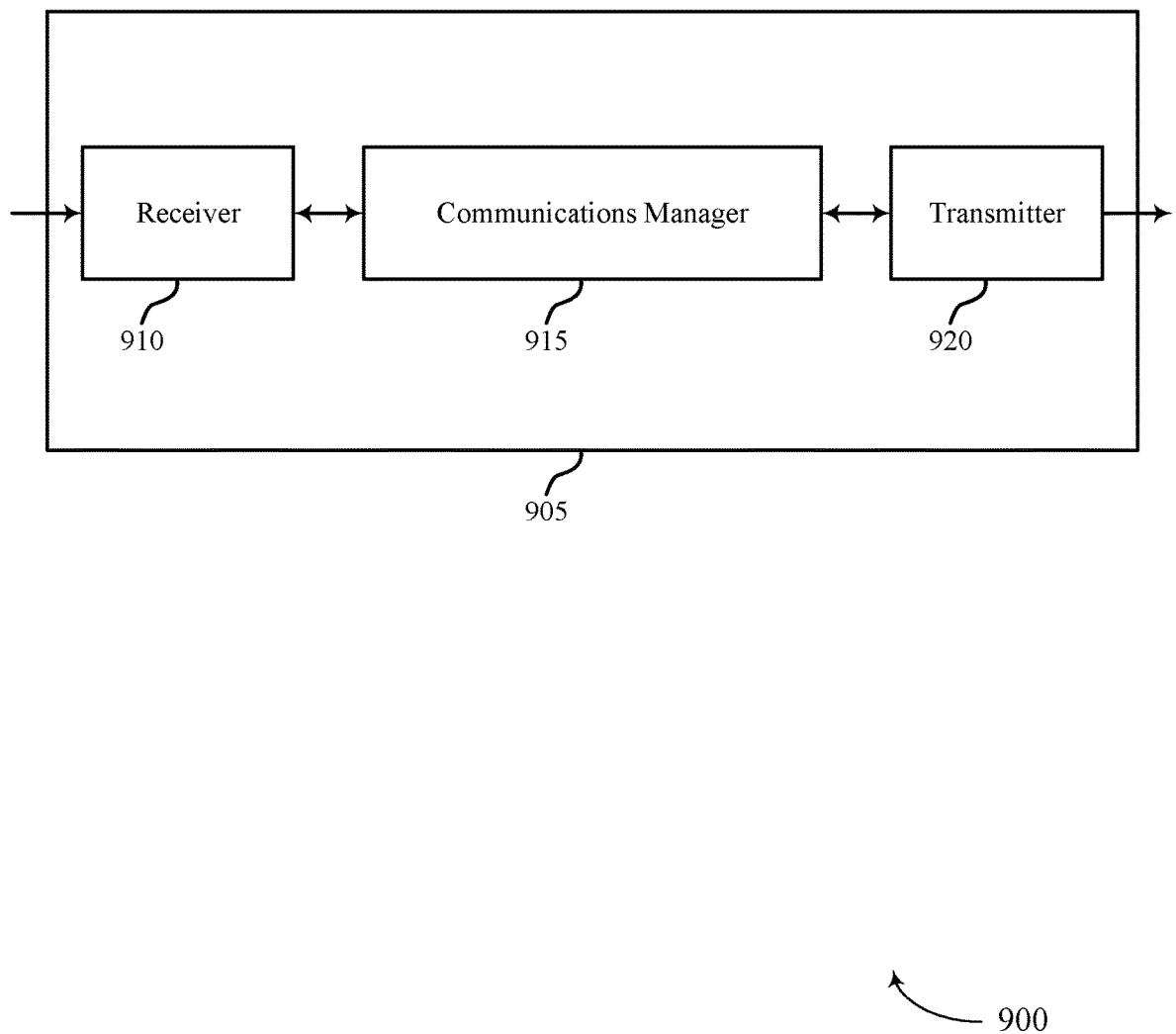
FIGS. 9 and 10 show block diagrams of devices that support on-demand BFR resources in accordance with one or more aspects of the present disclosure.

FIG. 9 shows a block diagram 900 of a device 905 that supports on-demand BFR resources in accordance with one or more aspects of the present disclosure. The device 905 may be an example of aspects of a UE 115 or base station 105 as described herein. The device 905 may include a receiver 910, a communications manager 915, and a transmitter 920. The device 905 may also include a processor. Each of these components may be in communication with one another (e.g., via one or more buses).

Receiver 910 may receive information such as packets, user data, or control information associated with various information channels (e.g., control channels, data channels, and information related to on-demand BFR resources, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas.

The communications manager 915 may determine a resource for wireless communication, the resource being in a first state where the resource is active for wireless communication and is inactive for a communication failure recovery procedure. The communications manager 915 may determine that a communication failure has occurred during a first communication period and transition, during a second communication period and based on the communication failure, the resource to a second state where the resource is inactive for wireless communication and is active for the communication recovery procedure. The communications manager 915 may additionally perform the communication failure recovery procedure using the resource transitioned to the second state. The communications manager 915 may be an example of aspects of the UE communications manager 1210 or base station communication manager 1310 as described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 920 may transmit signals generated by other components of the device 905. In some examples, the transmitter 920 may be collocated with a receiver 910 in a transceiver module. For example, the transmitter 920 may be an example of aspects of the transceiver 1220 or 1320 as described with reference to FIGS. 12 and 13. The transmitter 920 may utilize a single antenna or a set of antennas.

In some examples, the communications manager 915 may be implemented as an integrated circuit or chipset for a mobile device modem, and the receiver 910 and the transmitter 920 may be implemented as analog components (e.g., amplifiers, filters, antennas) coupled with the mobile device modem to enable wireless transmission and reception over one or more bands.

The communications manager 915 as described herein may be implemented to realize one or more potential benefits. One implementation may enable the device 905 to use a resource for normal wireless communication (e.g., transmitting or receiving control, data, or system information) in some situations and to dynamically switch to using the resource for a communication failure recovery procedure upon the detection of a beam failure event or a radio link failure event. As such, the device 905 may support higher efficiency resource usage than a device associated with preconfigured resources for communication failure recovery procedures.

Based on higher efficiency resource usage, the device 905 may support greater spectral efficiency and higher data throughput, which may enable the device 905 to communicate greater amounts of data or to receive data more efficiently (e.g., during a shorter timespan). As such, one or more processing units of the device 905 associated with wireless communication may transmit or receive data during shorter timespans, which may enable the processing units to spend longer durations in a sleep mode (e.g., a micro sleep mode). Accordingly, the device 905 may experience increased power savings and longer battery life.

Figure 10:
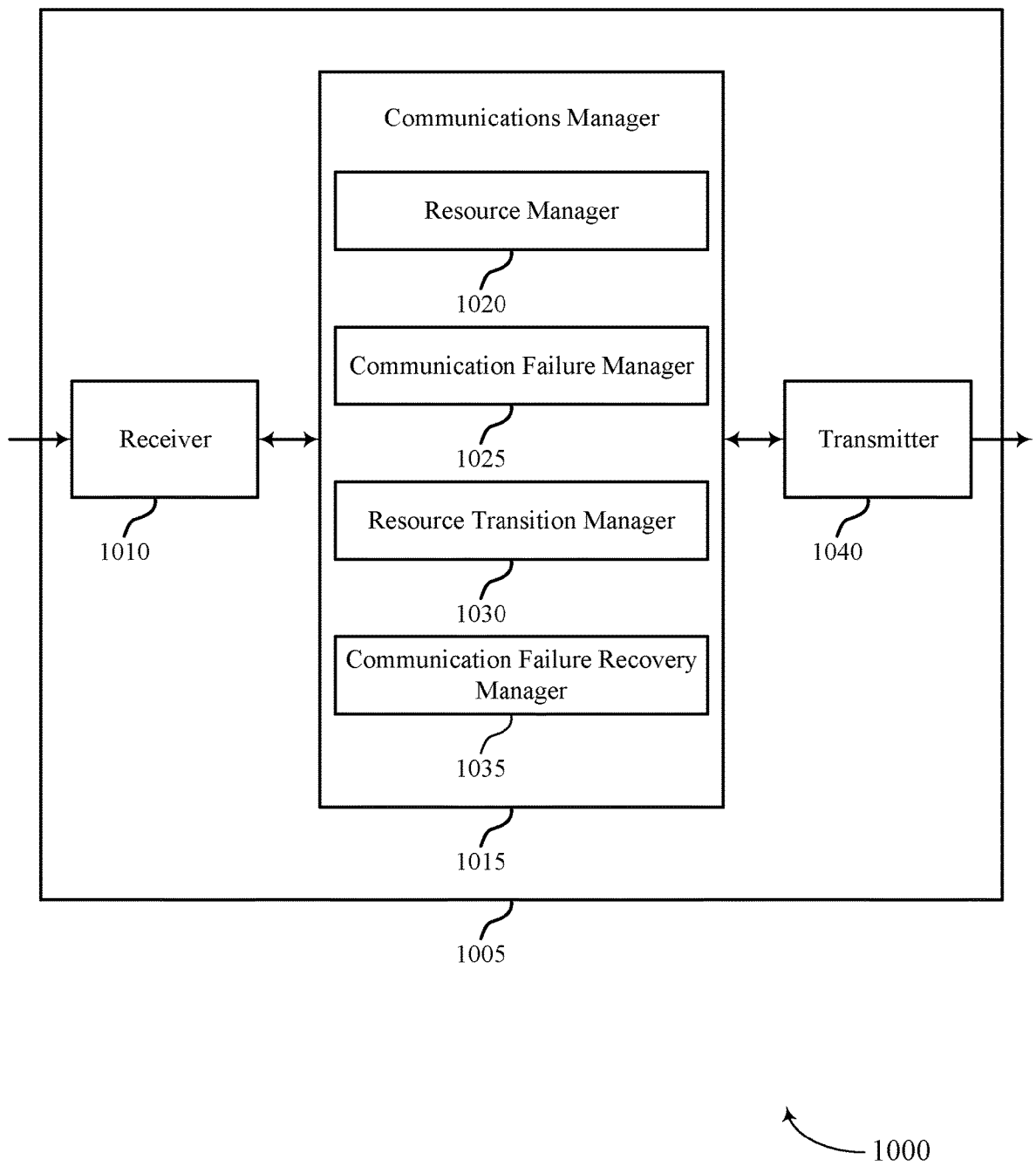

FIG. 10 shows a block diagram 1000 of a device 1005 that supports on-demand BFR resources in accordance with one or more aspects of the present disclosure. The device 1005 may be an example of aspects of a device 905, a UE 115, or a base station 105 as described herein. The device 1005 may include a receiver 1010, a communications manager 1015, and a transmitter 1040. The device 1005 may also include a processor. Each of these components may be in communication with one another (e.g., via one or more buses).

Receiver 1010 may receive information such as packets, user data, or control information associated with various information channels (e.g., control channels, data channels, and information related to on-demand BFR resources, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may be an example of aspects of the communications manager 915 as described herein. The communications manager 1015 may include a resource manager 1020, a communication failure manager 1025, a resource transition manager 1030, and a communication failure recovery manager 1035. The communications manager 1015 may be an example of aspects of the UE communications manager 1210 or base station communication manager 1310 as described herein.

The resource manager 1020 may determine a resource for wireless communication, the resource being in a first state where the resource is active for wireless communication and is inactive for a communication failure recovery procedure.

The communication failure manager 1025 may determine that a communication failure has occurred during a first communication period.

The resource transition manager 1030 may transition, during a second communication period and based on the communication failure, the resource to a second state where the resource is inactive for wireless communication and is active for the communication recovery procedure. The communication failure recovery manager 1035 may perform the communication failure recovery procedure using the resource transitioned to the second state.

Transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 or 1320 as described with reference to FIGS. 12 and 13. The transmitter 1040 may utilize a single antenna or a set of antennas.

Figure 11:
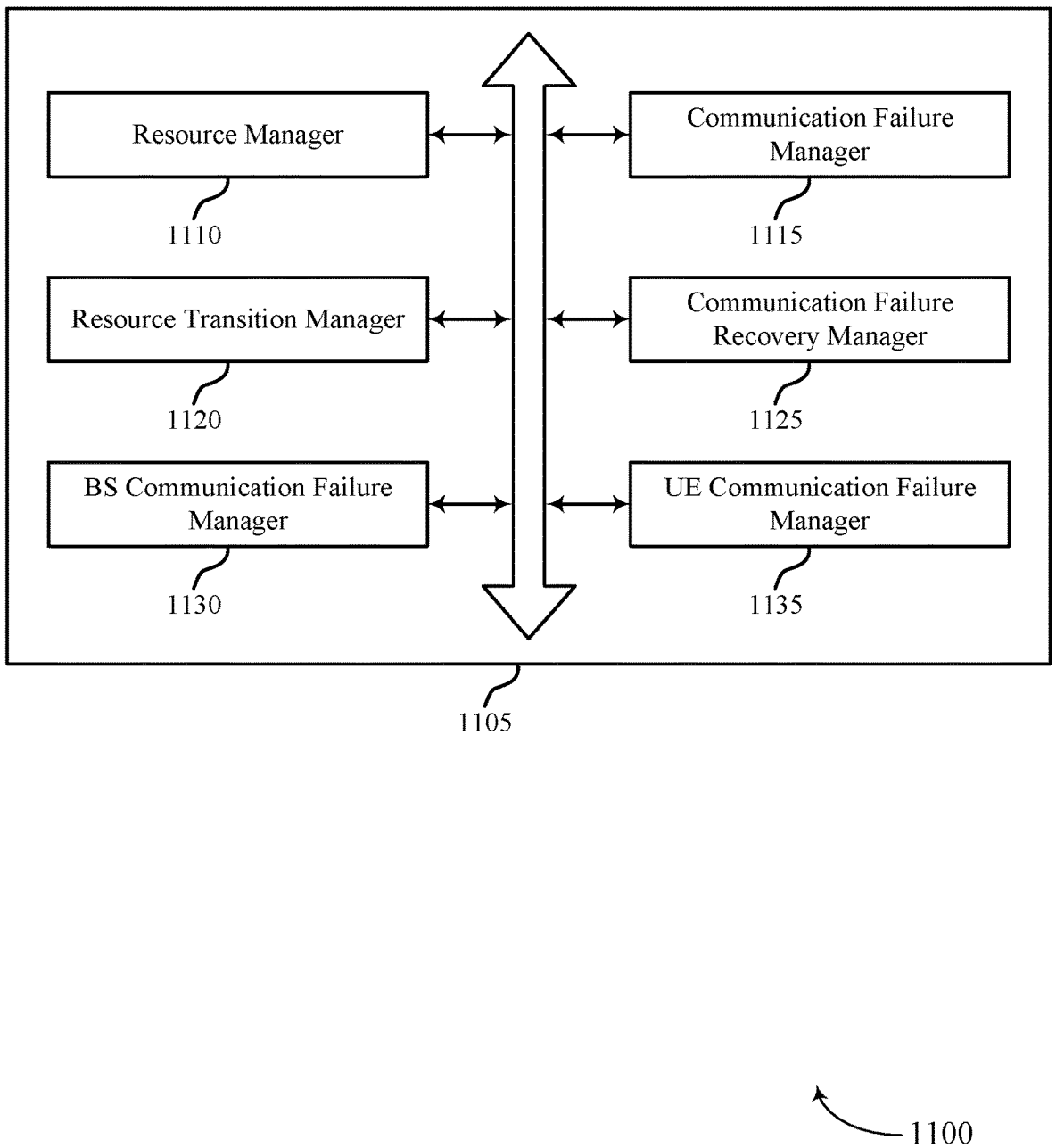
FIG. 11 shows a block diagram of a communications manager that supports on-demand BFR resources in accordance with one or more aspects of the present disclosure.

FIG. 11 shows a block diagram 1100 of a communications manager 1105 that supports on-demand BFR resources in accordance with one or more aspects of the present disclosure. The communications manager 1105 may be an example of aspects of a communications manager 915, a communications manager 1015, or a UE communications manager 1210 described herein. The communications manager 1105 may include a resource manager 1110, a communication failure manager 1115, a resource transition manager 1120, a communication failure recovery manager 1125, a base station communication failure manager 1130, and an UE communication failure manager 1135. Each of these modules may communicate, directly or indirectly, with one another (e.g., via one or more buses).

The resource manager 1110 may determine a resource for wireless communication, the resource being in a first state where the resource is active for wireless communication and is inactive for a communication failure recovery procedure.

The communication failure manager 1115 may determine that a communication failure has occurred during a first communication period. In some examples, the communication failure manager 1115 may determine that at least one of a downlink transmission or an uplink transmission was unsuccessful with a UE during the first communication period. In some examples, the communication failure manager 1115 may fail to receive a positive ACK message for either an initial downlink transmission or a downlink retransmission.

In some examples, the communication failure manager 1115 may determine that a number of codeblock groups having a positive ACK message in a received downlink ACK is below a threshold for either an initial downlink transmission or a downlink retransmission. In some examples, the communication failure manager 1115 may fail to receive an uplink packet in either an initial uplink transmission or an uplink retransmission. In some cases, the communication failure recovery procedure includes at least one of a BFR, or a radio link failure recovery, or a combination thereof. In some cases, the wireless device includes at least one of a UE or a base station.

The resource transition manager 1120 may transition, during a second communication period and based on the communication failure, the resource to a second state where the resource is inactive for wireless communication and is active for the communication recovery procedure. In some cases, the second communication period occurs after the first communication period.

The communication failure recovery manager 1125 may perform the communication failure recovery procedure using the resource transitioned to the second state.

The base station communication failure manager 1130 may transmit one or more BFR candidate beam reference signals using the resource transitioned to the second state. In some examples, the base station communication failure manager 1130 may receive a BFR request signal from the UE identifying a preferred candidate beam associated with at least one of the one or more BFR candidate beam reference signals. In some examples, the base station communication failure manager 1130 may transmit a BFR response.

In some examples, the base station communication failure manager 1130 may determine that a BFR request signal failed to be received from the UE during the second communication period. In some examples, the base station communication failure manager 1130 may perform wireless communication with the UE during a third communication period using a same beam as was used during the first communication period.

In some examples, the base station communication failure manager 1130 may determine that a BFR request signal was received from the UE during the second communication period. In some examples, the base station communication failure manager 1130 may perform wireless communication with the UE during a third communication period using a candidate beam identified in the BFR request signal.

The UE communication failure manager 1135 may determine that at least one of a downlink transmission or an uplink transmission was unsuccessful with a base station during the first communication period. In some examples, the UE communication failure manager 1135 may fail to receive a positive downlink ACK for either an initial downlink transmission or a downlink retransmission. In some examples, the UE communication failure manager 1135 may determine that a number of codeblock groups having a positive ACK message in a transmitted downlink ACK is below a threshold for either an initial downlink transmission or a downlink retransmission.

In some examples, the UE communication failure manager 1135 may fail to transmit an uplink packet in either an initial uplink transmission or an uplink retransmission. In some examples, the UE communication failure manager 1135 may receive one or more BFR candidate beam reference signals using the resource transitioned to the second state.

In some examples, the UE communication failure manager 1135 may transmit a BFR request signal to the base station identifying a preferred candidate beam associated with at least one of the one or more BFR candidate beam reference signals. In some examples, the UE communication failure manager 1135 may perform wireless communication with the base station during a third communication period using the preferred candidate beam identified in the BFR request signal. In some examples, the UE communication failure manager 1135 may receive a BFR response.

Figure 12:
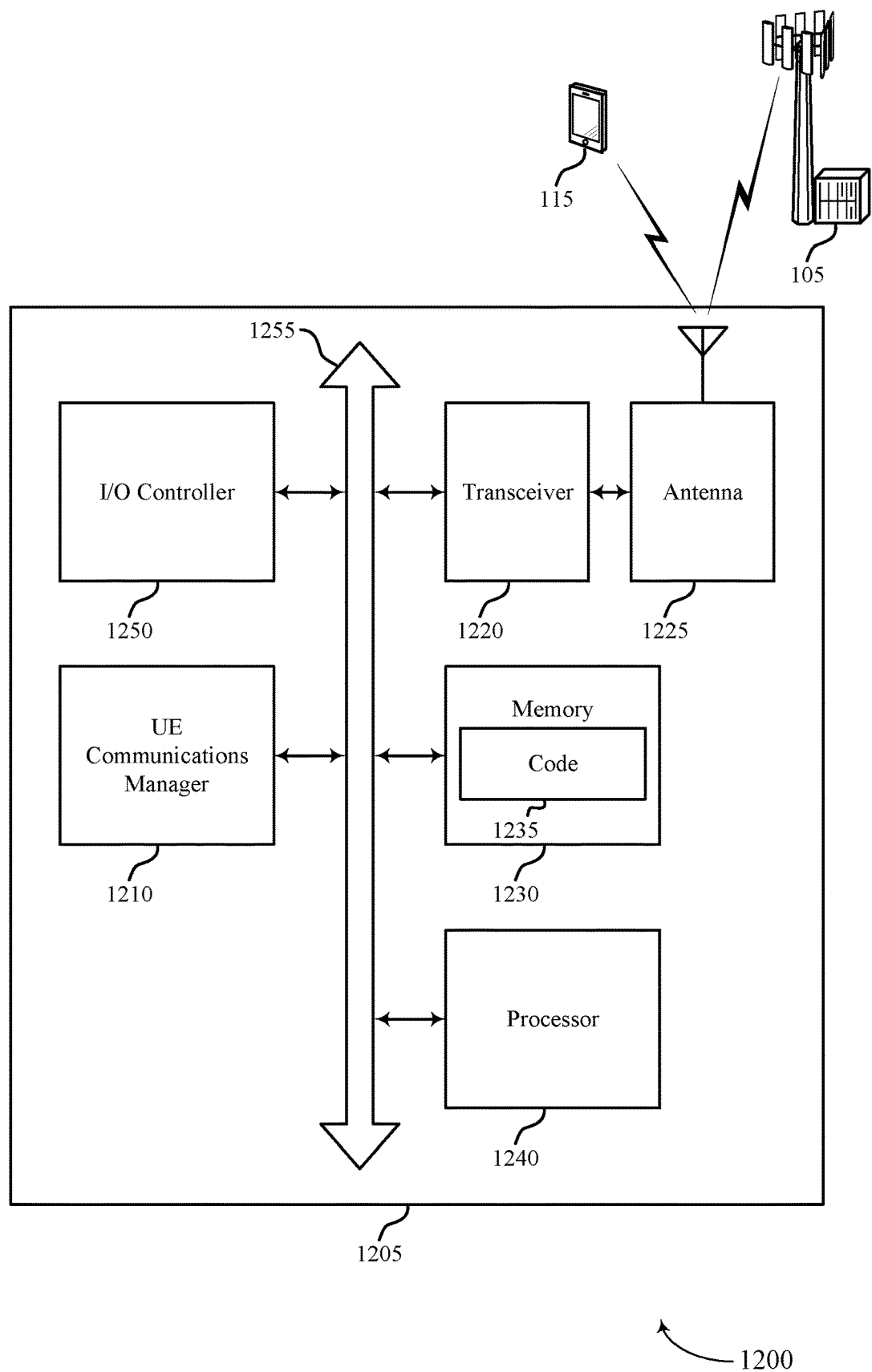
FIG. 12 shows a diagram of a system including a UE that supports on-demand BFR resources in accordance with one or more aspects of the present disclosure.

FIG. 12 shows a diagram of a system 1200 including a device 1205 that supports on-demand BFR resources in accordance with one or more aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, a transceiver 1220, an antenna 1225, memory 1230, a processor 1240, and an I/O controller 1250. These components may be in electronic communication via one or more buses (e.g., bus 1255).

The UE communications manager 1210 may identify a resource for wireless communication, the resource being in a first state where the resource is active for wireless communication and is inactive for a communication failure recovery procedure, determine that a communication failure has occurred during a first communication period, transition, during a second communication period and based on the communication failure, the resource to a second state where the resource is inactive for wireless communication and is active for the communication recovery procedure, and perform the communication failure recovery procedure using the resource transitioned to the second state.

Transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM), read-only memory (ROM), or a combination thereof. The memory 1230 may store computer-readable code 1235 including instructions that, when executed by a processor (e.g., the processor 1240) cause the device to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting on-demand BFR resources).

The I/O controller 1250 may manage input and output signals for the device 1205. The I/O controller 1250 may also manage peripherals not integrated into the device 1205. In some cases, the I/O controller 1250 may represent a physical connection or port to an external peripheral. In some cases, the I/O controller 1250 may utilize an operating system such as iOS®, ANDROID®, MS-DOS®, MS-WINDOWS®, OS/2®, UNIX®, LINUX®, or another known operating system. In other cases, the I/O controller 1250 may represent or interact with a modem, a keyboard, a mouse, a touchscreen, or a similar device. In some cases, the I/O controller 1250 may be implemented as part of a processor. In some cases, a user may interact with the device 1205 via the I/O controller 1250 or via hardware components controlled by the I/O controller 1250.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
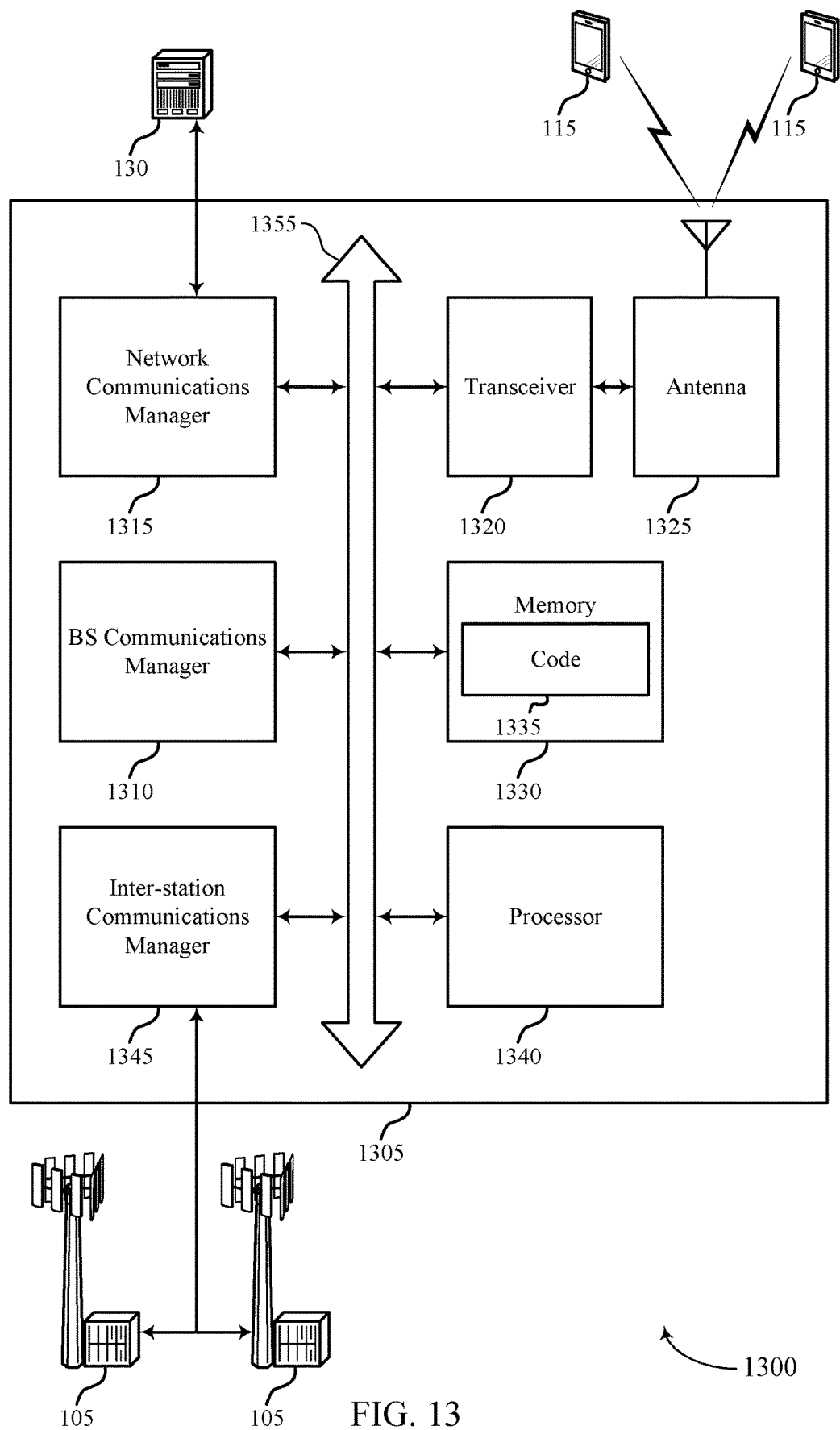
FIG. 13 shows a diagram of a system including a base station that supports on-demand BFR resources in accordance with one or more aspects of the present disclosure.

FIG. 13 shows a diagram of a system 1300 including a device 1305 that supports on-demand BFR resources in accordance with one or more aspects of the present disclosure. The device 1305 may be an example of or include the components of device 905, device 1005, or a base station 105 as described herein. The device 1305 may include components for bi-directional voice and data communications including components for transmitting and receiving communications, including a base station communication manager 1310, a network communications manager 1315, a transceiver 1320, an antenna 1325, memory 1330, a processor 1340, and an inter-station communications manager 1345. These components may be in electronic communication via one or more buses (e.g., bus 1355).

The base station communication manager 1310 may identify a resource for wireless communication, the resource being in a first state where the resource is active for wireless communication and is inactive for a communication failure recovery procedure, determine that a communication failure has occurred during a first communication period, transition, during a second communication period and based on the communication failure, the resource to a second state where the resource is inactive for wireless communication and is active for the communication recovery procedure, and perform the communication failure recovery procedure using the resource transitioned to the second state.

Network communications manager 1315 may manage communications with the core network (e.g., via one or more wired backhaul links). For example, the network communications manager 1315 may manage the transfer of data communications for client devices, such as one or more UEs 115.

Transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting on-demand BFR resources).

Inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
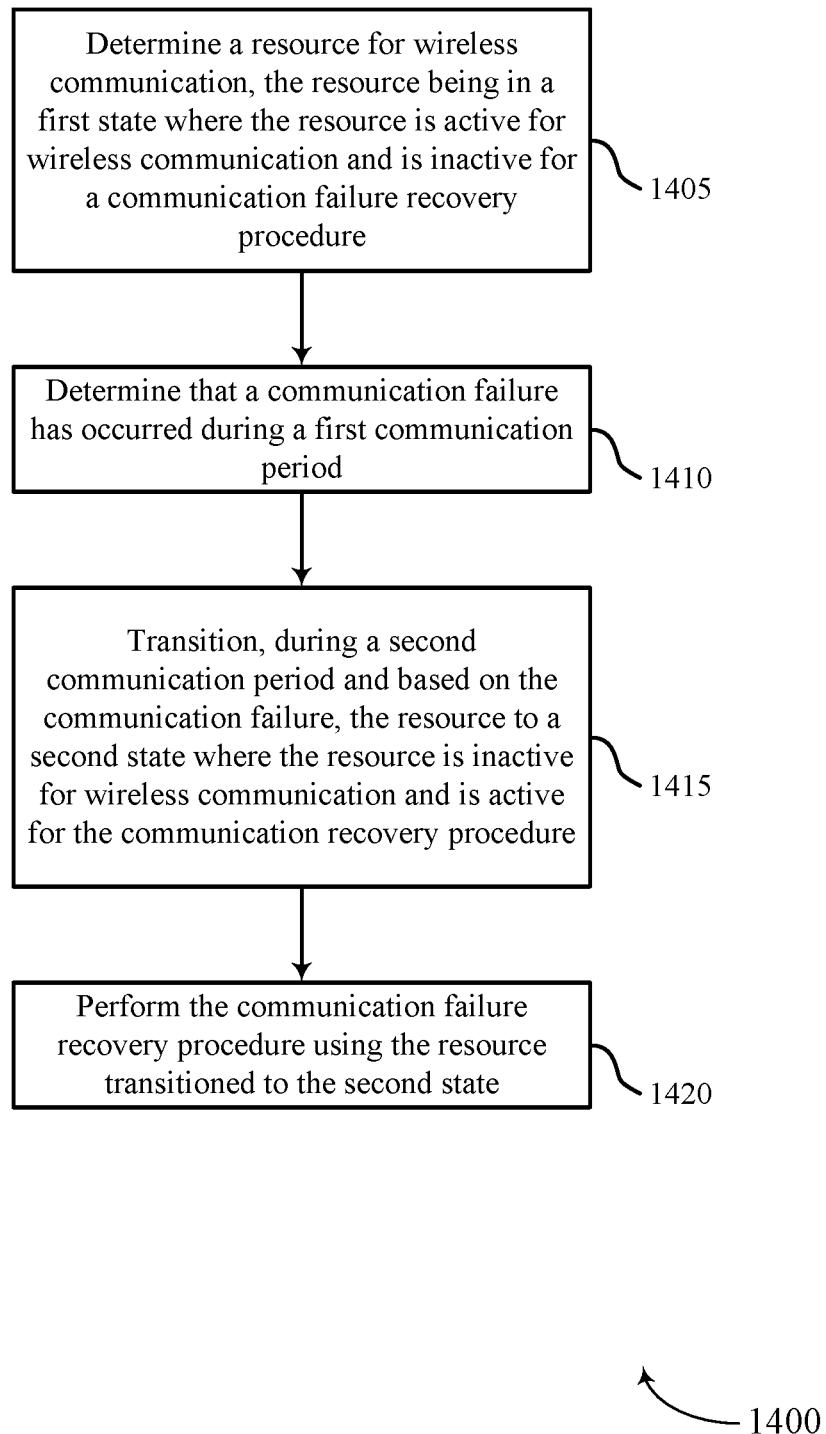
FIGS. 14 through 17 show flowcharts illustrating methods that support on-demand BFR resources in accordance with one or more aspects of the present disclosure.

FIG. 14 shows a flowchart illustrating a method 1400 that supports on-demand BFR resources in accordance with one or more aspects of the present disclosure. The operations of method 1400 may be implemented by a UE 115 or base station 105 or its components as described herein. For example, the operations of method 1400 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may determine a resource for wireless communication, the resource being in a first state where the resource is active for wireless communication and is inactive for a communication failure recovery procedure. The operations of 1405 may be performed according to the methods described herein. In some examples, aspects of the operations of 1405 may be performed by a resource manager as described with reference to FIGS. 9 through 13.

At 1410, the UE or base station may determine that a communication failure has occurred during a first communication period. The operations of 1410 may be performed according to the methods described herein. In some examples, aspects of the operations of 1410 may be performed by a communication failure manager as described with reference to FIGS. 9 through 13.

At 1415, the UE or base station may transition, during a second communication period and based on the communication failure, the resource to a second state where the resource is inactive for wireless communication and is active for the communication recovery procedure. The operations of 1415 may be performed according to the methods described herein. In some examples, aspects of the operations of 1415 may be performed by a resource transition manager as described with reference to FIGS. 9 through 13.

At 1420, the UE or base station may perform the communication failure recovery procedure using the resource transitioned to the second state. The operations of 1420 may be performed according to the methods described herein. In some examples, aspects of the operations of 1420 may be performed by a communication failure recovery manager as described with reference to FIGS. 9 through 13.

Figure 15:
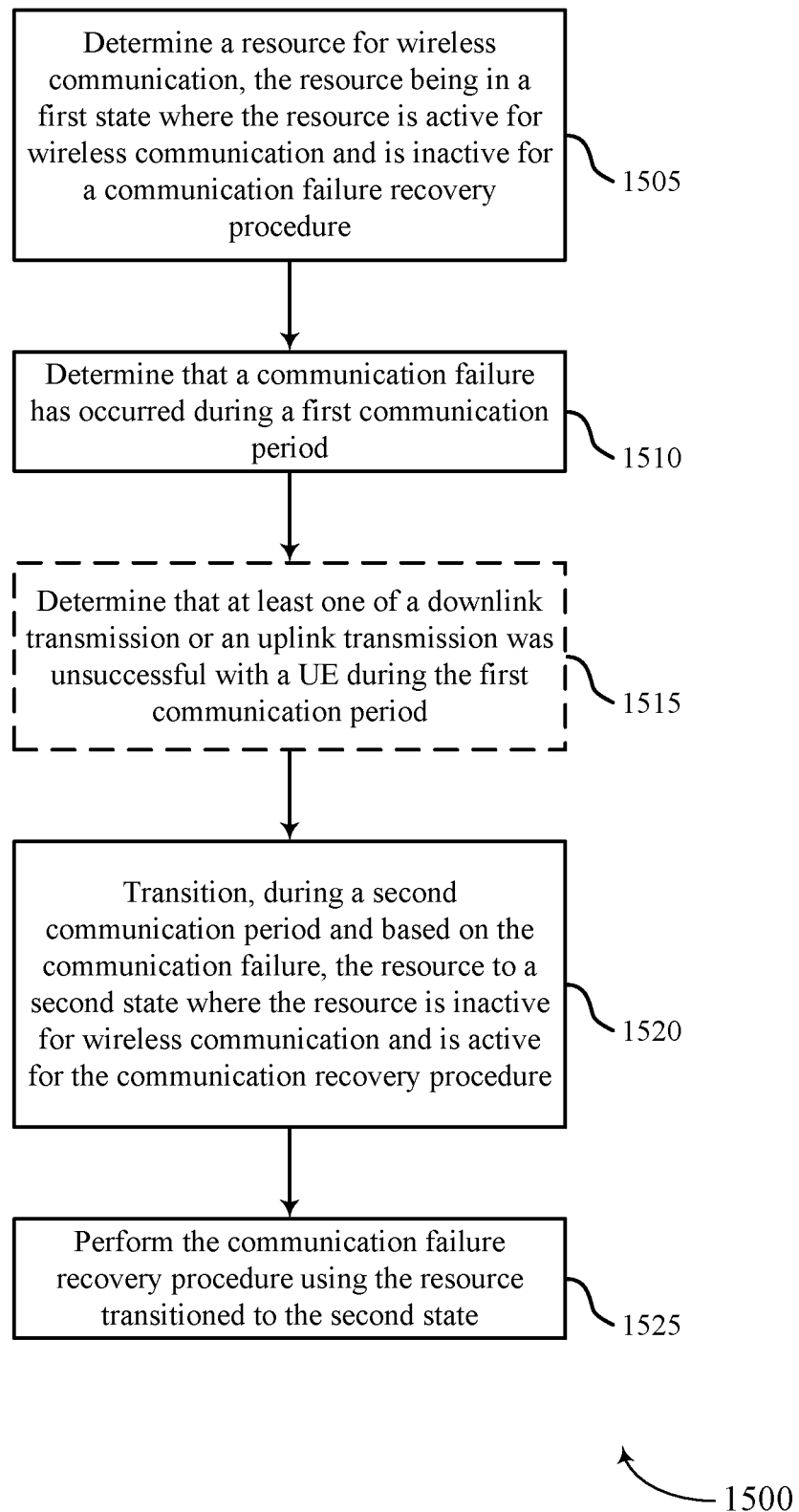

FIG. 15 shows a flowchart illustrating a method 1500 that supports on-demand BFR resources in accordance with one or more aspects of the present disclosure. The operations of method 1500 may be implemented by a UE 115 or base station 105 or its components as described herein. For example, the operations of method 1500 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may determine a resource for wireless communication, the resource being in a first state where the resource is active for wireless communication and is inactive for a communication failure recovery procedure. The operations of 1505 may be performed according to the methods described herein. In some examples, aspects of the operations of 1505 may be performed by a resource manager as described with reference to FIGS. 9 through 13.

At 1510, the UE or base station may determine that a communication failure has occurred during a first communication period. The operations of 1510 may be performed according to the methods described herein. In some examples, aspects of the operations of 1510 may be performed by a communication failure manager as described with reference to FIGS. 9 through 13.

At 1515, the UE or base station may optionally determine that at least one of a downlink transmission or an uplink transmission was unsuccessful with a UE during the first communication period. The operations of 1515 may be performed according to the methods described herein. In some examples, aspects of the operations of 1515 may be performed by a communication failure manager as described with reference to FIGS. 9 through 13.

At 1520, the UE or base station may transition, during a second communication period and based on the communication failure, the resource to a second state where the resource is inactive for wireless communication and is active for the communication recovery procedure. The operations of 1520 may be performed according to the methods described herein. In some examples, aspects of the operations of 1520 may be performed by a resource transition manager as described with reference to FIGS. 9 through 13.

At 1525, the UE or base station may perform the communication failure recovery procedure using the resource transitioned to the second state. The operations of 1525 may be performed according to the methods described herein. In some examples, aspects of the operations of 1525 may be performed by a communication failure recovery manager as described with reference to FIGS. 9 through 13.

Figure 16:
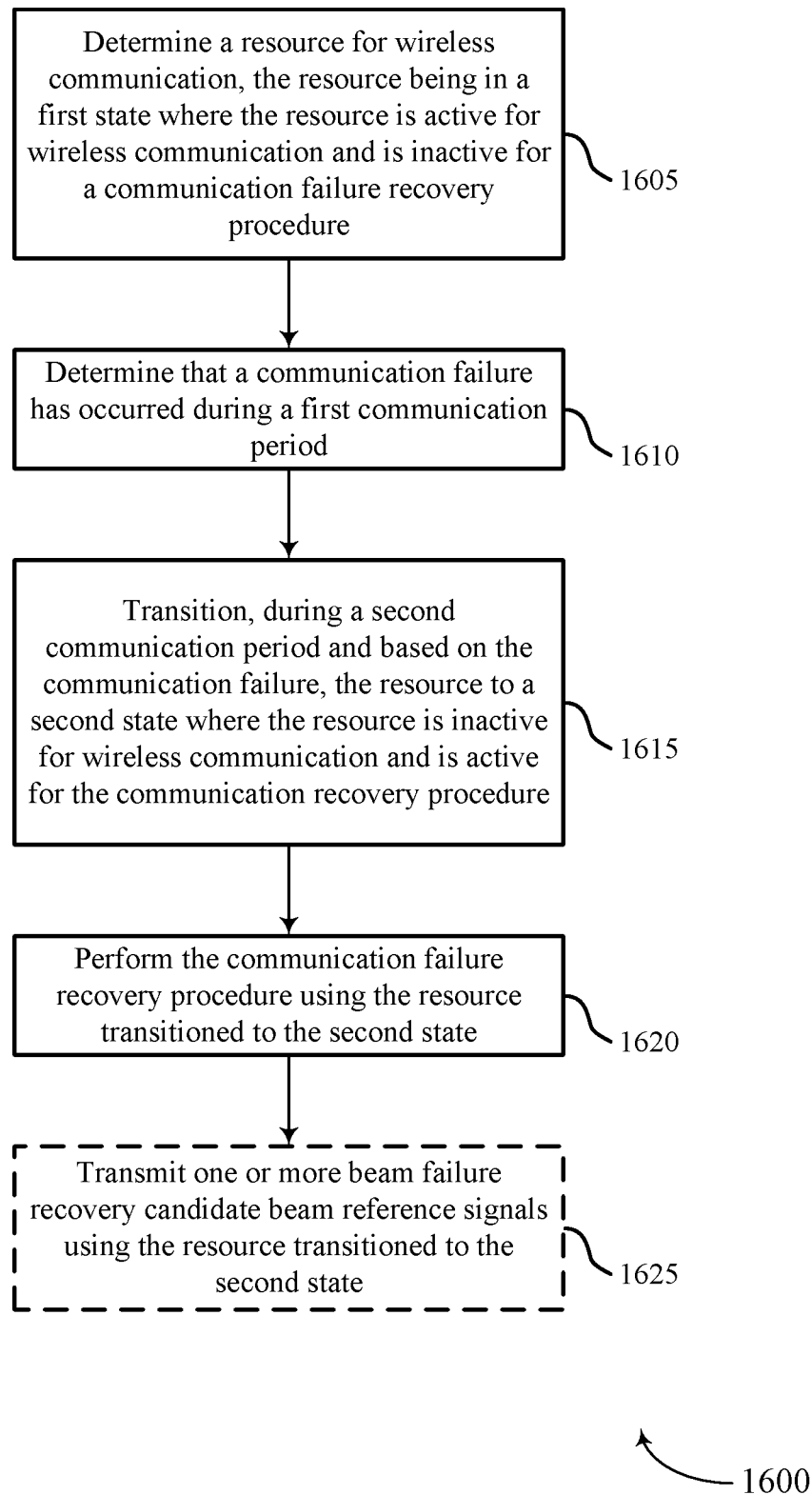

FIG. 16 shows a flowchart illustrating a method 1600 that supports on-demand BFR resources in accordance with one or more aspects of the present disclosure. The operations of method 1600 may be implemented by a UE 115 or base station 105 or its components as described herein. For example, the operations of method 1600 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may determine a resource for wireless communication, the resource being in a first state where the resource is active for wireless communication and is inactive for a communication failure recovery procedure. The operations of 1605 may be performed according to the methods described herein. In some examples, aspects of the operations of 1605 may be performed by a resource manager as described with reference to FIGS. 9 through 13.

At 1610, the UE or base station may determine that a communication failure has occurred during a first communication period. The operations of 1610 may be performed according to the methods described herein. In some examples, aspects of the operations of 1610 may be performed by a communication failure manager as described with reference to FIGS. 9 through 13.

At 1615, the UE or base station may transition, during a second communication period and based on the communication failure, the resource to a second state where the resource is inactive for wireless communication and is active for the communication recovery procedure. The operations of 1615 may be performed according to the methods described herein. In some examples, aspects of the operations of 1615 may be performed by a resource transition manager as described with reference to FIGS. 9 through 13.

At 1620, the UE or base station may perform the communication failure recovery procedure using the resource transitioned to the second state. The operations of 1620 may be performed according to the methods described herein. In some examples, aspects of the operations of 1620 may be performed by a communication failure recovery manager as described with reference to FIGS. 9 through 13.

At 1625, the UE or base station may optionally transmit one or more BFR candidate beam reference signals using the resource transitioned to the second state. The operations of 1625 may be performed according to the methods described herein. In some examples, aspects of the operations of 1625 may be performed by a base station communication failure manager as described with reference to FIGS. 9 through 13.

Figure 17:
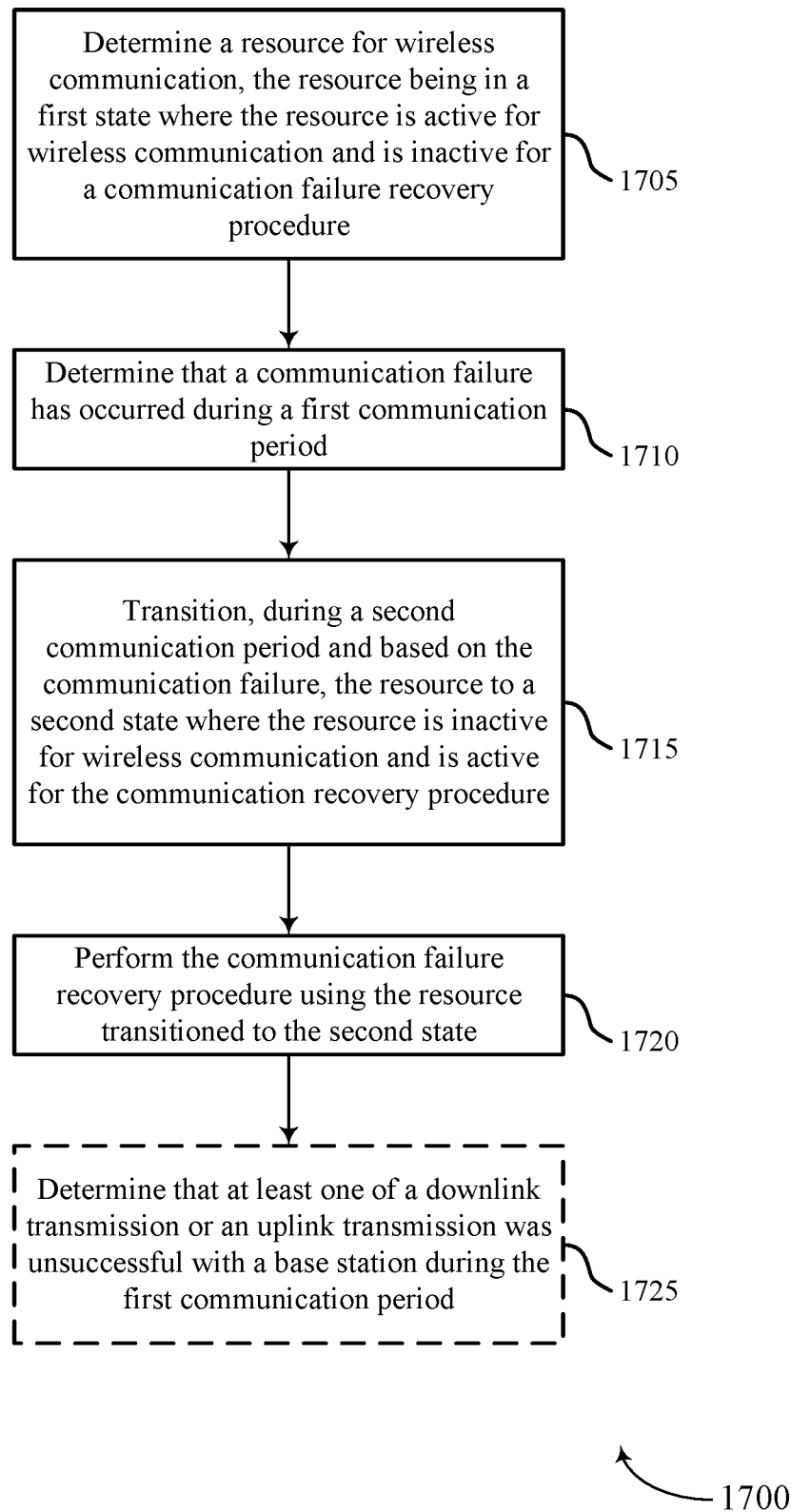

FIG. 17 shows a flowchart illustrating a method 1700 that supports on-demand BFR resources in accordance with one or more aspects of the present disclosure. The operations of method 1700 may be implemented by a UE 115 or base station 105 or its components as described herein. For example, the operations of method 1700 may be performed by a communications manager as described with reference to FIGS. 9 through 13. In some examples, a UE or base station may execute a set of instructions to control the functional elements of the UE or base station to perform the functions described herein. Additionally or alternatively, a UE or base station may perform aspects of the functions described herein using special-purpose hardware.

At 1705, the UE or base station may determine a resource for wireless communication, the resource being in a first state where the resource is active for wireless communication and is inactive for a communication failure recovery procedure. The operations of 1705 may be performed according to the methods described herein. In some examples, aspects of the operations of 1705 may be performed by a resource manager as described with reference to FIGS. 9 through 13.

At 1710, the UE or base station may determine that a communication failure has occurred during a first communication period. The operations of 1710 may be performed according to the methods described herein. In some examples, aspects of the operations of 1710 may be performed by a communication failure manager as described with reference to FIGS. 9 through 13.

At 1715, the UE or base station may transition, during a second communication period and based on the communication failure, the resource to a second state where the resource is inactive for wireless communication and is active for the communication recovery procedure. The operations of 1715 may be performed according to the methods described herein. In some examples, aspects of the operations of 1715 may be performed by a resource transition manager as described with reference to FIGS. 9 through 13.

At 1720, the UE or base station may perform the communication failure recovery procedure using the resource transitioned to the second state. The operations of 1720 may be performed according to the methods described herein. In some examples, aspects of the operations of 1720 may be performed by a communication failure recovery manager as described with reference to FIGS. 9 through 13.

At 1725, the UE or base station may optionally determine that at least one of a downlink transmission or an uplink transmission was unsuccessful with a base station during the first communication period. The operations of 1725 may be performed according to the methods described herein. In some examples, aspects of the operations of 1725 may be performed by an UE communication failure manager as described with reference to FIGS. 9 through 13.

The following provides an overview of examples of the present disclosure:

Example 1

A method for wireless communication at a device in a wireless network, comprising: determining a resource for wireless communication, the resource being in a first state where the resource is active for wireless communication and is inactive for a communication failure recovery procedure; determining that a communication failure has occurred during a first communication period; transitioning, during a second communication period and based at least in part on the communication failure, the resource to a second state where the resource is inactive for wireless communication and is active for the communication recovery procedure; and performing the communication failure recovery procedure using the resource transitioned to the second state.

Example 2

The method of example 1, wherein the communication failure recovery procedure comprises at least one of a BFR, or a radio link failure recovery, or a combination thereof.

Example 3

The method of any of examples 1 or 2, wherein determining that the communication failure has occurred comprises: determining that at least one of a downlink transmission or an uplink transmission was unsuccessful with a UE during the first communication period.

Example 4

The method of example 3, wherein a determination of an unsuccessful downlink transmission comprises: failing to receive a positive ACK message for either an initial downlink transmission or a downlink retransmission.

Example 5

The method of example 3, wherein a determination of an unsuccessful downlink transmission comprises: determining that a number of codeblock groups having a positive ACK message in a received downlink ACK is below a threshold for either an initial downlink transmission or a downlink retransmission.

Example 6

The method of example 3, wherein a determination of an unsuccessful uplink transmission comprises: failing to receive an uplink packet in either an initial uplink transmission or an uplink retransmission.

Example 7

The method of any of examples 1 through 6, further comprising: transmitting one or more BFR candidate beam reference signals using the resource transitioned to the second state.

Example 8

The method of example 7, further comprising: receiving a BFR request signal from the UE identifying a preferred candidate beam associated with at least one of the one or more BFR candidate beam reference signals.

Example 9

The method of example 8, further comprising: transmitting a BFR response.

Example 10

The method of example 7, further comprising: determining that a BFR request signal failed to be received from the UE during the second communication period; and performing wireless communication with the UE during a third communication period using a same beam as was used during the first communication period.

Example 11

The method of any of examples 7 through 9, further comprising: determining that a BFR request signal was received from the UE during the second communication period; and performing wireless communication with the UE during a third communication period using a candidate beam identified in the BFR request signal.

Example 12

The method of any of examples 1 through 11, wherein determining that the communication failure has occurred comprises: determining that at least one of a downlink transmission or an uplink transmission was unsuccessful with a base station during the first communication period.

Example 13

The method of example 12, wherein a determination of an unsuccessful downlink transmission comprises: failing to receive a positive downlink ACK for either an initial downlink transmission or a downlink retransmission.

Example 14

The method of example 12, wherein a determination of an unsuccessful downlink transmission comprises: determining that a number of codeblock groups having a positive ACK message in a transmitted downlink ACK is below a threshold for either an initial downlink transmission or a downlink retransmission.

Example 15

The method of any of examples 12 through 14, wherein a determination of an unsuccessful uplink transmission comprises: failing to transmit an uplink packet in either an initial uplink transmission or an uplink retransmission.

Example 16

The method of any of examples 1 through 15, further comprising: receiving one or more BFR candidate beam reference signals using the resource transitioned to the second state.

Example 17

The method of example 16, further comprising: transmitting a BFR request signal to the base station identifying a preferred candidate beam associated with at least one of the one or more BFR candidate beam reference signals; and performing wireless communication with the base station during a third communication period using the preferred candidate beam identified in the BFR request signal.

Example 18

The method of example 17, further comprising: receiving a BFR response.

Example 19

The method of any of examples 1 through 18, wherein the second communication period occurs after the first communication period.

Example 20

The method of any of examples 1 through 19, wherein the device in the wireless network comprises at least one of a UE or a base station.

Example 21

An apparatus for wireless communication comprising at least one means for performing a method of any one of examples 1 through 20.

Example 22

An apparatus for wireless communication comprising a processor, memory coupled to the processor, the process and memory configured to cause the apparatus to perform a method of any one of examples 1 through 20.

Example 23

A non-transitory computer-readable medium storing code for wireless communication comprising a processor, memory in electronic communication with the processor, and instructions stored in the memory and executable by the processor to cause the apparatus to perform a method of any one of examples 1 through 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a device in a wireless network, comprising:
   communicating using a periodic resource during a first communication period, the periodic resource being in a first state where the periodic resource is active for wireless communication and is inactive for a communication failure recovery procedure; and
   transmitting or receiving one or more beam failure recovery candidate beam reference signals associated with the communication failure recovery procedure using the periodic resource during a second communication period based at least in part on a communication failure occurring during the first communication period, the communication failure being associated with a transition of the periodic resource to a second state where the periodic resource is inactive for wireless communication and is active for the communication failure recovery procedure for the second communication period.

2. The method of claim 1, the communication failure recovery procedure comprising at least one of a beam failure recovery, or a radio link failure recovery, or a combination thereof.

3. The method of claim 1, the communication failure being based at least in part on at least one of a downlink transmission or an uplink transmission being unsuccessful with a user equipment (UE) during the first communication period.

4. The method of claim 3, further comprising:
   failing to receive a positive acknowledgement message for either an initial downlink transmission or a downlink retransmission, the communication failure being based at least in part on failing to receive the positive acknowledgement message.

5. The method of claim 3, further comprising:
   receiving a downlink acknowledgement including a number of codeblock groups having a positive acknowledgement message that is below a threshold for either an initial downlink transmission or a downlink retransmission, the communication failure being based at least in part on the number of codeblock groups having the positive acknowledgement message in the downlink acknowledgement being below the threshold.

6. The method of claim 3, further comprising:
   failing to receive an uplink packet in either an initial uplink transmission or an uplink retransmission, the communication failure being based at least in part on failing to receive the uplink packet.

7. The method of claim 1, further comprising:
   receiving a beam failure recovery request signal from a user equipment (UE) identifying a preferred candidate beam associated with at least one of the one or more beam failure recovery candidate beam reference signals.

8. The method of claim 7, further comprising:
   transmitting a beam failure recovery response.

9. The method of claim 1, further comprising:
   failing to receive a beam failure recovery request signal from a user equipment (UE) during the second communication period; and
   performing wireless communication with the UE during a third communication period using a same beam as was used during the first communication period.

10. The method of claim 1, further comprising:
    receiving a beam failure recovery request signal from a user equipment (UE) during the second communication period; and
    performing wireless communication with the UE during a third communication period using a candidate beam identified in the beam failure recovery request signal.

11. The method of claim 1, the communication failure being based at least in part on at least one of a downlink transmission or an uplink transmission being unsuccessful with a base station during the first communication period.

12. The method of claim 11, further comprising:
    failing to receive a positive downlink acknowledgement for either an initial downlink transmission or a downlink retransmission, the communication failure being based at least in part on failing to receive the positive downlink acknowledgement.

13. The method of claim 11, further comprising:
    transmitting a downlink acknowledgement including a number of codeblock groups having a positive acknowledgement message that is below a threshold for either an initial downlink transmission or a downlink retransmission, the communication failure being based at least in part on the number of codeblock groups having the positive acknowledgement message in the downlink acknowledgement being below the threshold.

14. The method of claim 11, further comprising:
failing to transmit an uplink packet in either an initial uplink transmission or an uplink retransmission, the communication failure being based at least in part on failing to transmit the uplink packet.

15. The method of claim 1, further comprising:
transmitting a beam failure recovery request signal to a base station identifying a preferred candidate beam associated with at least one of the one or more beam failure recovery candidate beam reference signals; and
performing wireless communication with the base station during a third communication period using the preferred candidate beam identified in the beam failure recovery request signal.

16. The method of claim 15, further comprising:
receiving a beam failure recovery response.

17. The method of claim 1, the second communication period occurring after the first communication period.

18. The method of claim 1, the device in the wireless network comprising at least one of a user equipment (UE) or a base station.

19. An apparatus for wireless communication at a device in a wireless network, comprising:
a processor; and
memory coupled to the processor, the processor and memory configured to:
communicate using a periodic resource during a first communication period, the periodic resource being in a first state where the periodic resource is active for wireless communication and is inactive for a communication failure recovery procedure; and
transmit or receive one or more beam failure recovery candidate beam reference signals associated with the communication failure recovery procedure using the periodic resource during a second communication period based at least in part on a communication failure occurring during the first communication period, the communication failure being associated with a transition of the periodic resource to a second state where the periodic resource is inactive for wireless communication and is active for the communication failure recovery procedure for the second communication period.

20. The apparatus of claim 19, the communication failure recovery procedure comprising at least one of a beam failure recovery, or a radio link failure recovery, or a combination thereof.

21. The apparatus of claim 19, the communication failure being based at least in part on at least one of a downlink transmission or an uplink transmission being unsuccessful with a user equipment (UE) during the first communication period.

22. The apparatus of claim 21, the processor and memory being further configured to:
fail to receive a positive acknowledgement message for either an initial downlink transmission or a downlink retransmission, the communication failure being based at least in part on failing to receive the positive acknowledgement message.

23. The apparatus of claim 19, the processor and memory being further configured to:
receive a beam failure recovery request signal from a user equipment (UE) identifying a preferred candidate beam associated with at least one of the one or more beam failure recovery candidate beam reference signals.

24. The apparatus of claim 23, the processor and memory being further configured to:
transmit a beam failure recovery response.

25. The apparatus of claim 19, the processor and memory being further configured to:
fail to receive a beam failure recovery request signal from a user equipment (UE) during the second communication period; and
perform wireless communication with the UE during a third communication period using a same beam as was used during the first communication period.

26. A non-transitory computer-readable medium storing code for wireless communication at a device in a wireless network, the code comprising instructions executable by a processor to:
communicate using a periodic resource during a first communication period, the periodic resource being in a first state where the periodic resource is active for wireless communication and is inactive for a communication failure recovery procedure; and
transmit or receive one or more beam failure recovery candidate beam reference signals associated with the communication failure recovery procedure using the periodic resource during a second communication period based at least in part on a communication failure occurring during the first communication period, the communication failure being associated with a transition of the periodic resource to a second state where the periodic resource is inactive for wireless communication and is active for the communication failure recovery procedure for the second communication period.

27. An apparatus for wireless communication at a device in a wireless network, comprising:
means for communicating using a periodic resource during a first communication period, the periodic resource being in a first state where the periodic resource is active for wireless communication and is inactive for a communication failure recovery procedure; and
means for transmitting or receiving one or more beam failure recovery candidate beam reference signals associated with the communication failure recovery procedure using the periodic resource during a second communication period based at least in part on a communication failure occurring during the first communication period, the communication failure being associated with a transition of the periodic resource to a second state where the periodic resource is inactive for wireless communication and is active for the communication failure recovery procedure for the second communication period.

28. The apparatus of claim 19, the communication failure being based at least in part on at least one of a downlink transmission or an uplink transmission being unsuccessful with a base station during the first communication period.

29. The apparatus of claim 28, the processor and memory being further configured to:
fail to receive a positive downlink acknowledgement for either an initial downlink transmission or a downlink retransmission, wherein the communication failure is based at least in part on failing to receive the positive downlink acknowledgement.

30. The apparatus of claim 19, the processor and memory being further configured to:
transmit a beam failure recovery request signal to a base station identifying a preferred candidate beam associated with at least one of the one or more beam failure recovery candidate beam reference signals; and perform wireless communication with the base station during a third communication period using the preferred candidate beam identified in the beam failure recovery request signal.

* * * * *